US012562794B2

(12) United States Patent
Su et al.

(10) Patent No.: US 12,562,794 B2
(45) Date of Patent: Feb. 24, 2026

(54) CSI FEEDBACK METHOD AND APPARATUS, ELECTRONIC DEVICE, AND STORAGE MEDIUM

(71) Applicant: DATANG MOBILE COMMUNICATIONS EQUIPMENT CO., LTD., Beijing (CN)

(72) Inventors: Xin Su, Beijing (CN); Mengjun Wang, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 470 days.

(21) Appl. No.: 18/016,318

(22) PCT Filed: May 25, 2021

(86) PCT No.: PCT/CN2021/095657
§ 371 (c)(1),
(2) Date: Jan. 13, 2023

(87) PCT Pub. No.: WO2022/012171
PCT Pub. Date: Jan. 20, 2022

(65) Prior Publication Data
US 2023/0291450 A1 Sep. 14, 2023

(30) Foreign Application Priority Data
Jul. 14, 2020 (CN) .......................... 202010676874.4

(51) Int. Cl.
*H04B 7/06* (2006.01)
*H04L 5/00* (2006.01)

(52) U.S. Cl.
CPC ......... *H04B 7/0626* (2013.01); *H04B 7/0639* (2013.01); *H04L 5/0051* (2013.01)

(58) Field of Classification Search
CPC .. H04B 7/0626; H04B 7/0639; H04B 7/0479; H04B 7/0632; H04B 7/06968;
(Continued)

(56) References Cited

U.S. PATENT DOCUMENTS

| | | | |
|---|---|---|---|
| 2017/0126300 A1* | 5/2017 | Park ...................... | H04L 5/0048 |
| 2020/0221429 A1 | 7/2020 | Li et al. | |

(Continued)

FOREIGN PATENT DOCUMENTS

| | | |
|---|---|---|
| CN | 109120313 A | 1/2019 |
| CN | 110536435 A | 12/2019 |

(Continued)

OTHER PUBLICATIONS

European Patent Office, Extended European Search Report Issued in Application No. 21843533.7, Jul. 19, 2024, Germany, 10 pages.
(Continued)

*Primary Examiner* — Un C Cho
*Assistant Examiner* — Theodore Im
(74) *Attorney, Agent, or Firm* — KILPATRICK TOWNSEND & STOCKTON LLP

(57) ABSTRACT

Embodiments of the present application provide a method and an apparatus for CSI feedback, an electronic device, and a storage medium. The method for CSI feedback includes: determining a CSI measurement resource corresponding to each data layer group during CSI measurement; determining first correspondence relations between each data layer group and DMRS ports during CSI measurement; determining mapping modes between each data layer group and CSI-RS ports during CSI measurement; determining transmission mode used in CSI measurement and CSI reporting mode corresponding to the transmission mode; and performing CSI feedback according to the CSI measurement resource, the first correspondence relations, the mapping modes, the
(Continued)

Determining a CSI measurement resource corresponding to each data layer group during CSI measurement — S101

Determining first correspondence relations between each data layer group and DMRS ports during CSI measurement — S102

Determining mapping modes between each data layer group and CSI-RS ports during CSI measurement — S103

Determining a transmission mode used in CSI measurement and a CSI reporting mode corresponding to the transmission mode — S104

Performing CSI feedback according to the CSI measurement resource, the first correspondence relations, the mapping modes, the transmission mode used in the CSI measurement and the CSI reporting mode corresponding to the transmission mode — S105 transmission mode used in the CSI measurement and the CSI reporting mode corresponding to the transmission mode. Therefore, the embodiments of the present application improve flexibility and accuracy of CSI feedback and reduce complexity of CSI feedback.

14 Claims, 2 Drawing Sheets

(58) Field of Classification Search
CPC ... H04L 5/0051; H04L 1/0693; H04L 5/0057; H04L 25/03929; H04L 5/0026
See application file for complete search history.

(56) References Cited

U.S. PATENT DOCUMENTS

| | | | | |
|---|---|---|---|---|
| 2020/0244320 | A1* | 7/2020 | Wang | H04B 7/0626 |
| 2020/0383091 | A1* | 12/2020 | Park | H04W 72/23 |
| 2021/0014021 | A1* | 1/2021 | Hunukumbure | H04W 72/04 |
| 2021/0021316 | A1* | 1/2021 | Bai | H04B 7/0626 |
| 2021/0211173 | A1* | 7/2021 | Rahman | H04L 5/0091 |
| 2021/0376898 | A1* | 12/2021 | Levitsky | H04B 7/0626 |
| 2022/0116171 | A1* | 4/2022 | Zhang | H04L 5/0094 |
| 2022/0271806 | A1* | 8/2022 | Zhu | H04B 7/0456 |
| 2023/0163911 | A1* | 5/2023 | Hao | H04L 27/261 370/329 |
| 2023/0198593 | A1* | 6/2023 | Zhang | H04B 7/0626 370/329 |

FOREIGN PATENT DOCUMENTS

| | | |
|---|---|---|
| CN | 110943943 A | 3/2020 |
| CN | 110958097 A | 4/2020 |
| WO | 2017071674 A1 | 5/2017 |
| WO | 2018126831 A1 | 7/2018 |

OTHER PUBLICATIONS

Samsung,"Discussions on NR multi-TRP and multi-panel support", 3GPP TSG RAN WG1 Meeting #88bis, Spokane, USA, Apr. 3-7, 2017, total 6 pages, R1-1705338.

Huawei et al.,"Technical Categorization for CSI enhancements MTRP and FR1 FDD reciprocity", 3GPP TSG RAN WG1 Meeting #102-e, E-meeting, Aug. 17-28, 2020, total 17 pages, R1-2007268.

* cited by examiner

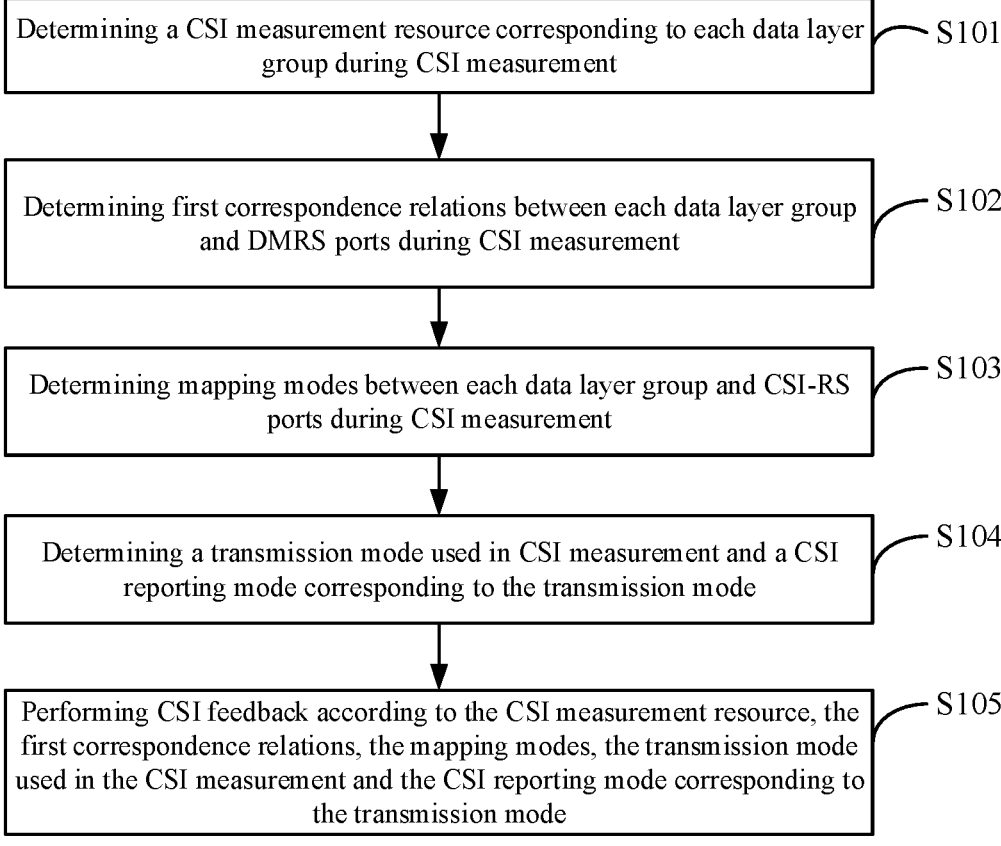

Determining a CSI measurement resource corresponding to each data layer group during CSI measurement — S101

Determining first correspondence relations between each data layer group and DMRS ports during CSI measurement — S102

Determining mapping modes between each data layer group and CSI-RS ports during CSI measurement — S103

Determining a transmission mode used in CSI measurement and a CSI reporting mode corresponding to the transmission mode — S104

Performing CSI feedback according to the CSI measurement resource, the first correspondence relations, the mapping modes, the transmission mode used in the CSI measurement and the CSI reporting mode corresponding to the transmission mode — S105

FIG. 1

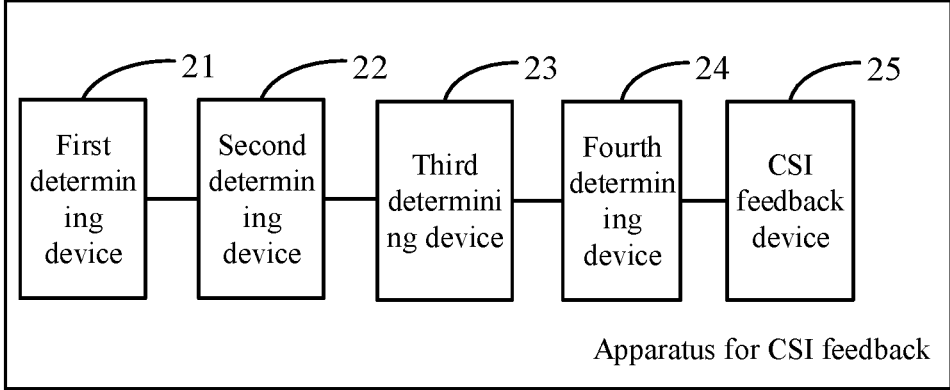

| First determining device (21) | Second determining device (22) | Third determining device (23) | Fourth determining device (24) | CSI feedback device (25) |

Apparatus for CSI feedback

FIG. 2

CSI FEEDBACK METHOD AND APPARATUS, ELECTRONIC DEVICE, AND STORAGE MEDIUM

CROSS-REFERENCE TO RELATED APPLICATION

The present application is a National Stage of International Application No. PCT/CN2021/095657, filed on May 25, 2021, which claims priority to Chinese application No. 202010676874.4 filed on Jul. 14, 2020, entitled "CSI Feedback Method and Apparatus, Electronic Device, and Storage Medium", which are hereby incorporated by reference in their entireties.

FIELD

The present application relates to the field of communication, and in particular, to a method and an apparatus for CSI feedback, and an electronic device, and a storage medium.

BACKGROUND

Performance of multi input multi output (MIMO) transmission is based on channel state information (CSI) feedback, and thus the CSI feedback plays an important role in an entire MIMO design.

Nowadays, long term evolution (LTE) system has defined a variety of different feedback types in different standardized versions (Rel-8 to Rel-14) to support CSI feedback for different MIMO transmission modes, which results in different transmission modes and the dispersion and complexity of CSI feedback.

Therefore, how to avoid dispersion and complexity of CSI feedback in a 5G system is a problem that needs to be solved at present.

SUMMARY

Embodiments of the present application provide a method and an apparatus for CSI feedback, an electronic device, and a storage medium, which can solve the defects of dispersion and complexity of CSI feedback and improve flexibility and accuracy of CSI feedback.

An embodiment of the present application provides a method for CSI feedback, including:

determining a CSI measurement resource corresponding to each data layer group during CSI measurement;

determining first correspondence relations between each data layer group and demodulation reference signal (DMRS) ports during CSI measurement;

determining mapping modes between each data layer group and channel state information reference signal (CSI-RS) ports during CSI measurement;

determining a transmission mode used in CSI measurement and a CSI reporting mode corresponding to the transmission mode; and performing CSI feedback according to the CSI measurement resource, the first correspondence relations, the mapping modes, the transmission mode used in the CSI measurement and the CSI reporting mode corresponding to the transmission mode.

In an embodiment, according to the method for CSI feedback of the present application, the determining a CSI measurement resource corresponding to each data layer group during CSI measurement includes:

grouping a first number of data layers used for CSI measurement, to obtain a second number of data layer groups; and configuring one CSI measurement resource for each data layer group.

In an embodiment, according to the method for CSI feedback of the present application, the CSI measurement resource includes:

a CSI-RS resource; and/or a CSI-RS resource set; and/or different CSI-RS port subsets in a same resource.

In an embodiment, according to the method for CSI feedback of the present application, the second number is less than or equal to 2.

In an embodiment, according to the method for CSI feedback of the present application, the determining first correspondence relations between each data layer group and DMRS ports during CSI measurement includes:

configuring one DMRS port group for each data layer group, where the number of DMRS ports in the DMRS port group is the same as the number of data layers in a data layer group corresponding to the DMRS port group.

In an embodiment, according to the method for CSI feedback of the present application, each DMRS port in the DMRS port group is quasi co-located (QCL).

In an embodiment, according to the method for CSI feedback of the present application, the configuring one DMRS port group for each data layer group includes:

configuring the DMRS port group by using a first formula, where the first formula is denoted as:

$$\begin{bmatrix} y_0^{DMRSGroup\_i} \\ \vdots \\ y_{N_i-1}^{DMRSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

In an embodiment, according to the method for CSI feedback of the present application, the determining mapping modes between each data layer group and CSI-RS ports during CSI measurement includes:

mapping the first number of data layers used for CSI measurement to a third number of CSI-RS ports, the third number being greater than or equal to the first number.

In an embodiment, according to the method for CSI feedback of the present application, the first number of data layers are divided into the second number of data layer groups;

the mapping the first number of data layers used for CSI measurement to a third number of CSI-RS ports includes:

in case that precoding matrix indicator (PMI) reporting is needed, determining precoding matrixes corresponding to each data layer group, and determining a first mapping relation between each data layer group and a CSI-RS port group corresponding to the data layer group according to the precoding matrixes;

in case that no PMI reporting is needed, and a second correspondence relation between each data layer group and CSI-RS ports is indicated by a network side, determining a second mapping relation between each data layer group and a CSI-RS port group corresponding to the data layer group according to the second correspondence relation; and in case that no PMI reporting is needed, and no second correspondence relation is indicated by the network side, configuring a third mapping relation between each data layer group and a CSI-RS port group corresponding to the data layer group, where the number of CSI-RS ports in the CSI-RS port group is greater than or equal to the number of data layers in a data layer group corresponding to the DMRS port group, and each CSI-RS port group corresponds to one CSI measurement resource.

In an embodiment, according to the method for CSI feedback of the present application, the determining a first mapping relation between each data layer group and a CSI-RS port group corresponding to the data layer group according to the precoding matrixes includes:

determining the first mapping relation by using a second formula, where the second formula is denoted as:

$$\begin{bmatrix} y_0^{CSI-RSGroup\_i} \\ \vdots \\ y_{N_i-1}^{CSI-RSGroup\_i} \end{bmatrix} = W^{Group\_i} \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$W^{Group\_i}$ represents a precoding matrix corresponding to the i-th data layer group;

$y_0^{CS-RSGroup\_i}$ represents a first CSI-RS port in a i-th CSI-RS port group; and $y_{M_i-1}^{CS-RSGroup\_i}$ represents a $M_i$-th CSI-RS port in the i-th CSI-RS port group;

the determining a second mapping relation between each data layer group and the CSI-RS port group corresponding to the data layer group includes:

determining the second mapping relation by using a third formula, where the third formula is denoted as:

$$\begin{bmatrix} y_{p_0^{(N_i-1)}}^{CSI-RSGroup\_i} \\ \vdots \\ y_{p_{N_i-1}^{(N_i-1)}}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$$y_{p_{N_i-1}^{(N_i-1)}}^{CSI-RSGroup\_i}$$

represents a first CSI-RS port in a i-th CSI-RS port group when a rank is ($N_i-1$); and $$y_{p_{N_i-1}^{(N_i-1)}}^{CSI-RSGroup\_i}$$

represents a $N_i$-th CSI-RS port in the i-th CSI-RS port group when the rank is ($N_i-1$);

the configuring a third mapping relation between each data layer group and the CSI-RS port group corresponding to the data layer group includes:

determining the third mapping relation by using a fourth formula, where the fourth formula is denoted as:

$$\begin{bmatrix} y_0^{CSI-RSGroup\_i} \\ \vdots \\ y_{N_i-1}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{CS-RSGroup\_i}$ represents a first CSI-RS port in a i-th CSI-RS port group; and $y_{N_i-1}^{CS-RSGroup\_i}$ represents a $N_i$-th CSI-RS port in the i-th CSI-RS port group.

In an embodiment, according to the method for CSI feedback of the present application, the transmission mode used in CSI measurement includes a first transmission mode, and the first transmission mode is used to characterize that only one data layer group is transmitted; and a CSI reporting mode corresponding to the first transmission mode includes a first CSI reporting mode or a second CSI reporting mode, where the first CSI reporting mode includes reporting a CSI corresponding to one data layer group and a first identification information, and the first identification information is used to characterize a CSI-RS port group to which a data layer group to be reported is mapped; and the second CSI reporting mode includes reporting CSI corresponding to all data layer groups.

In an embodiment, according to the method for CSI feedback of the present application, the transmission mode used in the CSI measurement includes a second transmission mode, and the second transmission mode is used to characterize that all data layer groups are transmitted simultaneously; and a CSI reporting mode corresponding to the second transmission mode includes reporting CSIs corresponding to all data layer groups.

In an embodiment, according to the method for CSI feedback of the present application, it further includes:

in case that PMI reporting is needed, reporting a precoding matrix used by the data layer group to be reported and the number of data layers of the data layer group to be reported; and in case that no PMI reporting is needed, reporting the number of data layers of the data layer group to be reported.

In an embodiment, according to the method for CSI feedback of the present application, the method further includes:

reporting CQI information.

Embodiments of the present application further provides an apparatus for CSI feedback, including:

a first determining device, used to determine a channel state information (CSI) measurement resource corresponding to each data layer group during CSI measurement;

a second determining device, used to determine first correspondence relations between each data layer group and demodulation reference signal (DMRS) ports during CSI measurement;

a third determining device, used to determine mapping modes between each data layer group and channel state information-reference signal (CSI-RS) ports during CSI measurement;

a fourth determining device, used to determine a transmission mode used in CSI measurement and a CSI reporting mode corresponding to the transmission mode; and a CSI feedback device, used to perform CSI feedback according to the CSI measurement resource, the first correspondence relations, the mapping modes, the transmission mode used in the CSI measurement and the CSI reporting mode corresponding to the transmission mode.

Embodiments of the present application further provides an electronic device, including, a processor, and a memory having a computer program stored thereon executable by the processor, where the computer program, when executed by the processor, causes the processor to perform steps of any one of the above-mentioned method for CSI feedback.

Embodiments of the present application further provides a non-transitory computer-readable storage medium having a computer program stored thereon, where the computer program, when executed by a processor, causes the processor to perform steps of any one of the above-mentioned method for CSI feedback.

In the method and apparatus for CSI feedback, electronic device, and storage medium provided by the embodiment of the present application, by determining a CSI measurement resource corresponding to each data layer group during CSI measurement, determining first correspondence relations between each data layer group and DMRS ports during CSI measurement, determining mapping modes between each data layer group and CSI-RS ports during CSI measurement, determining a transmission mode used in CSI measurement and a CSI reporting mode corresponding to the transmission mode, and performing CSI feedback according to the CSI measurement resource, the first correspondence relations, the mapping modes, the transmission mode used in the CSI measurement and the CSI reporting mode corresponding to the transmission mode, flexibility and accuracy of CSI feedback is improved and complexity of CSI feedback is reduced.

BRIEF DESCRIPTION OF THE DRAWINGS

In order to more clearly illustrate the embodiments in the present application, the following will briefly introduce the accompanying drawings that need to be configured in the description of the embodiments. The accompanying drawings in the following description are some embodiments of the present application.

FIG. 1 is a flow diagram of a method for CSI feedback according to an embodiment of the present application.

FIG. 2 is a structural diagram of an apparatus for CSI feedback according to an embodiment of the present application.

6

Figure 4:
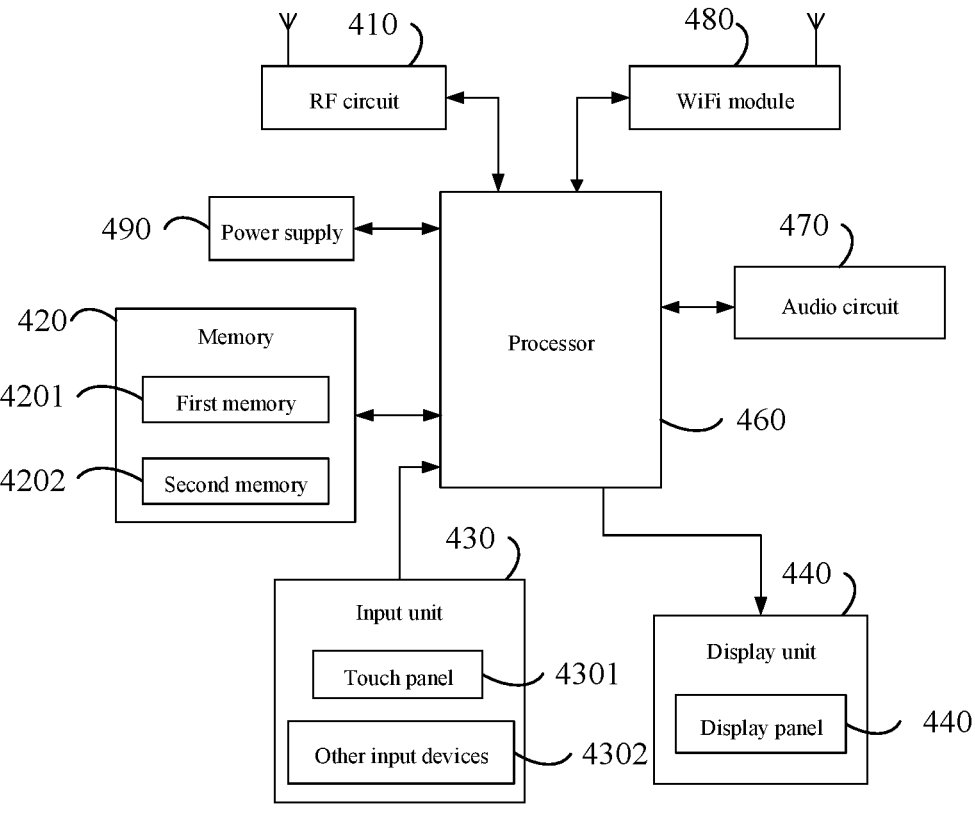

FIG. 4 is a structural diagram of an electronic device according to another embodiment of the present application.

DETAILED DESCRIPTION

In order to illustrate the embodiments of the present application, the embodiments in present the present application will be described clearly and completely below in conjunction with the drawings in the embodiments of the present application. The described embodiments are part of the embodiments of the present application, not all of them.

In order to describe the embodiments of the present application, if the words "first", "second" and other words are used in each embodiment of the present application to distinguish the same or similar items with basically the same function and function, the words "first", "second" and other words do not limit the quantity and execution order.

Performance of MIMO transmission is based on CSI feedback, and thus the CSI feedback plays an important role in the entire MIMO design. LTE system has defined a variety of different feedback types in different standardized versions (Rel-8 to Rel-14) to support CSI feedback for different MIMO transmission mode. This design results in different transmission mode and the dispersion and complexity of CSI feedback.

Therefore, how to avoid dispersion and complexity of CSI feedback in a 5G system is a problem that needs to be solved at present.

In order to avoid introducing multiple feedback types/sub feedback types in the 5G system, a unified CSI feedback framework is considered. The system design decouples CSI measurement and CSI feedback, separates measurement resources and measurement operations from specific reporting operations to support different MIMO transmission modes in multiple scenarios and multiple frequency bands in a more flexible mode. In addition, for new beam management requirements of the 5G system, it also needs to report a beam indication and a corresponding reference signal receiving power (RSRP) and other information.

In a new radio (NR) system, CSI can include channel quality indicator (CQI), precoding matrix indicator (PMI), a channel state information-reference signal resource indicator (CRI), a synchronization signal/physical broadcast channel block resource indicator (SSBRI), a layer indicator (LI), a rank indicator (RI), and a layer 1 reference signal received power (L1-RSRP). SSBRI, LI and L1-RSRP are new feedback quantities based on CSI feedback of the LTE system. LI is used to indicate a strongest column in PMI, and is used for phase tracking reference signal (PT-RS) mapping. SSBRI and L1-RSRP are used for beam management, one of them indicates a beam index and the other of them indicates a beam strength.

According to the above principle of decoupling CSI measurement and CSI feedback, the system will configure N≥1 reporting settings, which are used for reporting different measurement results, and M≥1 CSI-RS resource settings for each user equipment (UE). Each reporting setting is associated with one or more resource settings, which are used for channel measurement and reporting and interference measurement and reporting. Different measurement sets and reporting combinations can be flexibly set according to different terminal requirements and application scenarios.

The reporting setting includes the configuration of the following parameters: a CSI report quantity, a codebook configuration, a time domain behavior for CSI feedback, frequency domain granularity for PMI and CQI, and a measurement constraint configuration. The CSI report quantity is used to indicate whether UE performs feedbacks related to beam management or feedbacks related to CSI acquisition related.

Periodic, semi-persistent and aperiodic CSI feedback schemes are supported in the NR. For periodic and semi-persistent CSI feedback schemes, feedback cycle and feedback slot offset of the reporting setting needs to be configured in the reporting setting. Each reporting setting can be associated with one or two resource settings. For aperiodic CSI feedback, feedback slot offset is indicated by a dynamic signaling, and each reporting setting can be associated with 1, 2 or 3 resource settings.

Broadband or subband feedback are supported in the NR. A subband size for subband CSI reporting is related to a bandwidth part (BWP) actually used by the terminal (since a bandwidth of the 5G system is generally wide, the entire system bandwidth is usually divided into BWPs of different sizes for power saving considerations, and each terminal sends and receives within the BWP bandwidth allocated). Each BWP configuration bandwidth can contain two candidate subband sizes, which can be configured through radio resource control (RRC). For the subband CSI reporting, multiple subbands can be configured continuously or discontinuously in a frequency domain.

A CSI-RS time domain behavior in the NR can be configured to periodic, semi-persistent and aperiodic.

The resource setting is used for channel measurement or interference measurement. Each resource setting contains $S \geq 1$ resource set, and each resource set contains $K_s \geq 1$ CSI-RS resources. Periodic, semi-persistent and aperiodic resource settings are supported by the NR, and its time-domain behavior is configured in resource settings. For periodic and semi-persistent resource settings, only one resource set can be configured, that is, S=1. One or more resource sets can be configured for aperiodic resource settings. In order to distinguish CSI acquisition from beam management, a beam repetition indicator parameter Repetition is further introduced, which is configured in the resource set to indicate CSI-RS in this resource set is used for beam management and whether CSI-RS is sent by using repetition beam.

MIMO schemes introduced in Rel-15 are all for single point transmission. In order to improve cell edge coverage and provide more balanced service quality of service in a service area, multi-point cooperation is an important means in a NR R16 system. Considering the deployment condition, frequency band and antenna form of the NR system, the present application of a coordinated multi-point transmission technology in the NR system has more significant practical significance. First of all, from a perspective of network morphology, network deployment in a form of a large number of distributed access points plus centralized baseband processing will be more conducive to providing a balanced user experience rate, and significantly reducing the delay and signaling overhead caused by cross-cell handover. With the increase in frequency band, relatively intensive access point deployment is also required to ensure network coverage. In a high frequency band, with the improvement of the integration of active antenna equipment, a modular active antenna array will be more preferred. The antenna array of each transmission reception point (TRP) can be divided into several relatively independent antenna sub arrays or panel, so a shape and the number of ports of the entire array can be flexibly adjusted according to deployment scenarios and business requirements. The panels or TRPs can also be connected by optical fiber for more flexible distributed deployment. In a millimeter wave band, with the decrease of wavelength, the blocking effect caused by obstacles such as human body or vehicle will be more significant. In order to ensure link connection robustness, a cooperation between multiple TRPs or panels can also be used to transmit/receive multiple beams from multiple angles, to reduce adverse effects of blocking effects.

According to a mapping relation between a sending signal flow and multiple TRPs/panels, the coordinated multi-point transmission technology can be roughly divided into coherent and non-coherent transmission. For coherent transmission, each data layer will be mapped to multiple TRPs/panels through weighting vectors. For non-coherent transmission, each data stream is only mapped to part of the TRPs/panels. Coherent transmission has higher requirements for synchronization between transmission points and transmission capability of backhaul, so it is more sensitive to many non-ideal factors in real deployment conditions. In contrast, non-coherent transmission is less affected by the above factors, so it is the key considerate scheme of NR multi-point transmission technology.

When multiple TRP/panels transmit cooperatively, signals sent by different TRP/panels may have relatively independent large-scale characteristics, such as an average delay, a delay spread, an average Doppler shift, a Doppler spread, and a spatial receiver (Rx) parameter. In the NR system, a case where large-scale parameters for two or more reference signal channels are consistent is said to be quasi co-located. On the contrary, it is said to be non-quasi co-located. The NR system stipulates that demodulation reference signal (DMRS) ports in the same code division multiplexing (CDM) group are quasi co-located.

DMRS ports in the NR system are multiplexed by frequency division multiplexing (FDM) as well as code division multiplexing (CDM). Multiple ports are divided by orthogonal code division multiplexing (OCC) in each CDM group, and CDM groups are distinguished by FDM. Two pilot types are supported by the NR, and the used pilot types are configured through high layer signaling.

According to different service requirements and backhaul link capacities, three types of multi TRP cooperative transmission mode are introduced in R16.

1) Multiple physical downlink control channels (PDCCH) are used to schedule their own physical downlink shared channels (PDSCH), which is abbreviated as M-DCI (downlink control information) schemes.

In this scheme, each TRP can be independently scheduled, to achieve high flexibility. Transmission and control indicators for each TRP are relatively independent, and this scheme is suitable for scenarios with non-ideal quality of the backhaul link that cannot be closely coordinated.

2) A single PDCCH is used to schedule a PDSCH, where each layer is transmitted through only one TRP, which is abbreviated as S-DCI scheme.

In this scheme, the data layers sent by each TRP use the same resource allocation. In single code word transmission with no more than four layers, all layers use the same Modulation and Coding Scheme (MCS). Since time-frequency resources occupied by each layer are completely overlapped, the S-DCI scheme has higher frequency band utilization efficiency. Since all TRP need to send the same PDSCH together, closer cooperation between TRP is required. Therefore, requirements for the backhaul link capacities are high. In addition, when the channel quality of each TRP may be different, the S-DCI scheme may not be able to independently adjust a modulation and coding scheme (MCS) according to channels of each TRP, nor can it independently allocate resources.

3) A transmission mode based on multi-point cooperation to improve transmission reliability/reduce delay is abbreviated as URLLC (ultra-reliable and low delay communication) enhancement scheme.

The overall URLLC enhancement scheme uses a mechanism of the S-DCI. During the transmission, the cooperation of multiple TRPs can be used to introduce redundancy in a space domain, a time domain and a frequency domain to improve reliability/reduce delay.

It should be noted that a CSI feedback mechanism defined in Rel-15 is mainly for single point transmission and coherent multi-point transmission, and it cannot well support multi-point non-coherent transmission.

Therefore, based on a multi-point cooperative scheme, each TRP independently performs CSI measurement and report. In some embodiments, actual scheduling and transmission situation cannot be reflected during calculation of the CSI.

For the above problems, embodiments of the present application provide a method and an apparatus for CSI feedback, an electronic device, and a storage medium to improve flexibility and accuracy of CSI feedback.

The method and apparatus for CSI feedback, electronic device, and storage medium provided by the embodiments of the present application can be applied to wireless communication systems or hybrid wireless and wired systems, which includes, but not limited to, the 5G system (such as the NR system), a 6G system, a satellite system, an Internet of Vehicles system, an evolved long term evolution system, and subsequent evolved communication system of the above systems.

A base station provided by the embodiments of the present application can include, but is not limited to, one or more of the following: a commonly used base station, an evolved node base station (eNB), a base station in the 5G system (such as a next generation node base station (gNB), a transmission and reception point (TRP) and other equipments.

A terminal provided by the embodiments of the present application can also be called user equipment (UE), etc. The terminal includes, but not limited to, a handheld equipment and a vehicle-mounted equipment. For example, it can be a mobile phone, a tablet PC, a notebook computer, an ultra-mobile personal computer (UMPC), a netbook, a personal digital assistant (PDA), etc.

The following is explained by specific embodiments.

FIG. 1 is a flow diagram of a method for CSI feedback according to an embodiment of the present application. The method for CSI feedback can be performed by electronic devices for performing CSI feedback, such as a terminal. As shown in FIG. 1, the method for CSI feedback can include the following steps.

S101: determining a CSI measurement resource corresponding to each data layer group during CSI measurement.

In an embodiment, during coordinated multi-point transmission, each data layer group is sent through one TRP, and the network side will associate CSI measurement resources corresponding to different TRPs in advance through configuration and indication signaling, and then notify the terminal of performing CSI measurement for coordinated multi-point transmission using these CSI measurement resources.

The CSI measurement resource can include:
    a CSI-RS resource; and/or
    a CSI-RS resource set; and/or different CSI-RS port subsets in a same resource.

For example, the network side associates CSI-RS resources corresponding to different TRPs through configuration and indication signaling, or associates CSI-RS resource sets corresponding to different TRPs, or associates CSI-RS port subsets corresponding to different TRPs in the same resource, and then notifies the terminal of performing CSI measurement for coordinated multi-point transmission using CSI-RS resources corresponding to different TRPs, or CSI-RS resource sets corresponding to different TRPs, or CSI-RS port subsets corresponding to different TRPs in the same resource.

S102: determining first correspondence relations between each data layer group and DMRS ports during CSI measurement.

In an embodiment, one data layer corresponds to one DMRS port.

For example, v data layers are transmitted through PDSCH used by UE performing CSI measurement by CSI-RS. Each data layer corresponds to a DMRS port. If the v data layers for CSI measurement can be divided into at most two groups (corresponding to one TRP respectively), each data layer group correspond to one DMRS port group during PDSCH transmission.

S103: determining mapping modes between each data layer group and CSI-RS ports during CSI measurement.

In an embodiment, when CSI measurement is performed by UE using CSI-RS, v layers PDSCH data sent through v DMRS ports are mapped to P CSI-RS ports. Each CSI-RS port group corresponds to one CSI-RS resource, or different CSI-RS port groups correspond to different CSI-RS port subsets in the same CSI-RS resource.

S104: determining a transmission mode used in CSI measurement and a CSI reporting mode corresponding to the transmission mode.

In an embodiment, when CSI measurement is performed by UE using CSI-RS, the transmission mode and the CSI reporting mode corresponding to the transmission mode can be determined according to an actual situation.

S105: performing CSI feedback according to the CSI measurement resource, the first correspondence relations, the mapping modes, the transmission mode used in the CSI measurement and the CSI reporting mode corresponding to the transmission mode.

Flexibility and accuracy of CSI feedback are improved and complexity of CSI feedback is reduced by determining a CSI measurement resource corresponding to each data layer group during CSI measurement, determining first correspondence relations between each data layer group and DMRS ports during CSI measurement, determining mapping modes between each data layer group and CSI-RS ports during CSI measurement, determining a transmission mode used in CSI measurement and a CSI reporting mode corresponding to the transmission mode, and performing CSI feedback according to the CSI measurement resource, the first correspondence relations, the mapping modes, the transmission mode used in the CSI measurement and the CSI reporting mode corresponding to the transmission mode.

In an embodiment, based on the above methods, S101 can include the following steps:

S1011: grouping a first number of data layers used for CSI measurement, to obtain a second number of data layer groups.

In an embodiment, since each data layer group is sent through one TRP, the data layers can be grouped according to data of the TRP, and each data layer group obtained corresponds to one TRP.

The second number can be less than or equal to 2.

For example, when CSI measurement is performed by UE using CSI-RS, the UE uses PDSCH to transmit v data layers, and the v data layers are divided into two groups:

data layer group 1 including the following $N_i$ data layers: $x_0^{Layer\ Group1}, \ldots x_{N_i-1}^{Layer\ Group1}$; and data layer group 2 including the following $N_2$ data layers: $x_0^{Layer\ Group2}, \ldots, x_{N_i-1}^{Layer\ Group2}$.

S1012: configuring one CSI measurement resource for each data layer group.

In an embodiment, the CSI measurement resource can include:

a CSI-RS resource; and/or a CSI-RS resource set.

For example, one CSI-RS resource, or different CSI-RS port subsets in the same CSI-RS resource is configured for each data layer group.

By grouping a first number of data layers used for CSI measurement, to obtain a second number of data layer groups, and configuring one CSI measurement resource for each data layer group, the CSI measurement resource is configured based on data layer groups, different requirements for UE and application scenarios are satisfied, and flexibility of CSI feedback is improved.

In an embodiment, based on the above methods, S102 can include the following steps:

S1021: configuring one DMRS port group for each data layer group, where the number of DMRS ports in the DMRS port group is the same as the number of data layers in a data layer group corresponding to the DMRS port group.

In an embodiment, the total number of data layer groups is the same as the total number of DMRS port groups.

In an embodiment, based on the above methods, in S1021, the DMRS port group can be configured by using the first formula, where the first formula is denoted as:

$$
\begin{bmatrix} y_0^{DMRSGroup\_i} \\ \vdots \\ y_{N_i-1}^{DMRSGroup\_i} \end{bmatrix} = \begin{bmatrix} x_0^{LayerGroup\_i} \\ \vdots \\ x_{N_i-1}^{LayerGroup\_i} \end{bmatrix},
$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

For example, when CSI measurement is performed by UE using CSI-RS, the user uses PDSCH to transmit v data layers, and the v data layers are divided into two groups:

data layer group 1 including the following $N_i$ data layers: $x_0^{Layer\ Group1}, \ldots, x_{N_i-1}^{Layer\ Group1}$; and and data layer group 2 including the following $N_2$ data layers: $x_0^{Layer\ Group2}, \ldots, x_{N_i-1}^{Layer\ Group2}$.

The correspondence relation between data layer group 1 and DMRS port group 1 is as follows:

$$
\begin{bmatrix} y_0^{DMRSGroup1} \\ \vdots \\ y_{N_i-1}^{DMRSGroup1} \end{bmatrix} = \begin{bmatrix} x_0^{LayerGroup1} \\ \vdots \\ x_{N_i-1}^{LayerGroup1} \end{bmatrix}.
$$

The correspondence relation between data layer group 2 and DMRS port group 2 is as follows:

$$
\begin{bmatrix} y_0^{DMRSGroup2} \\ \vdots \\ y_{N_2-1}^{DMRSGroup2} \end{bmatrix} = \begin{bmatrix} x_0^{LayerGroup2} \\ \vdots \\ x_{N_2-1}^{LayerGroup2} \end{bmatrix},
$$

where $y_0^{DMRSGroup1}, \ldots, y_{N_i-1}^{DMRSGroup1}$ represents $N_1$ DMRS ports included in DMRS port group 1, $y_0^{DMRSGroup2}, \ldots, y_{N_2-1}^{DMRSGroup2}$ represents $N_2$ DMRS ports included in DMRS port group 2, and a sum of $N_1$ and $N_2$ is v.

In addition, each DMRS port in the DMRS port group is quasi co-located.

In an embodiment, the DMRS ports can be grouped in the quasi co-located scheme, that is, ports of each DMRS port group are belonging to the same DMRS CDM group (a sum of the number of ports in the two DMRS port groups is equal to v).

For example, DMRS port group 1 is CDM group 0, and DMRS port group 2 is CDM group 1.

By configuring one DMRS port group for each data layer group, where the number of DMRS ports in the DMRS port group is the same as the number of data layers in a data layer group corresponding to the DMRS port group, the DMRS ports are configured based on the data layer groups, that is, one data layer corresponds to one DMRS port.

In an embodiment, based on the above methods, S103 may include the following steps:

S1031: mapping the first number of data layers used for CSI measurement to a third number of CSI-RS ports, and the third number is greater than or equal to the first number.

In an embodiment, when CSI measurement is performed by UE using CSI-RS, v layers of PDSCH data sent through v DMRS ports are mapped to P CSI-RS ports. Each CSI-RS port group corresponds to one CSI-RS resource, or different CSI-RS port groups correspond to different CSI-RS port subsets in the same CSI-RS resource.

In an embodiment, based on the above methods, the first number of data layers are divided into the second number of data layer groups; S1031 may further include the following steps:

S1032: in case that PMI reporting is needed, determining precoding matrixes corresponding to each data layer group, and determining a first mapping relation between each data layer group and a CSI-RS port group corresponding to the data layer group according to the precoding matrixes;

S1033: in case that no PMI reporting is needed, and the second correspondence relation between each data layer group and CSI-RS ports is indicated by a network side, determining a second mapping relation between each data layer group and the CSI-RS port group corresponding to the data layer group according to the second correspondence relation; and S1034: in case that no PMI reporting is needed, and no second correspondence relation is indicated by the network side, configuring a third mapping relation between each data layer group and the CSI-RS port group corresponding to the data layer group, where the number of CSI-RS ports in the CSI-RS port group is greater than or equal to the number of data layers in a data layer group corresponding to the DMRS port group, and each CSI-RS port group corresponds to one CSI measurement resource.

In an embodiment, based on the above methods, in S1032, the first mapping relation can be determined by using the second formula, where the second formula is denoted as:

$$
\begin{bmatrix}
y_0^{CSI-RSGroup\_i} \\
\vdots \\
y_{M_i-1}^{CSI-RSGroup\_i}
\end{bmatrix}
= W^{Group\_i}
\begin{bmatrix}
x_0^{LayerGroup\_i} \\
\vdots \\
x_{N_i-1}^{LayerGroup\_i}
\end{bmatrix},
$$

where $x_0^{Layer\ Group\_i}$ represents the first data layer in the i-th data layer group;

$x_{N_i-1}^{Layer\ Group\_i}$ represents the $N_i$-th data layer in the i-th data layer group;

$W^{Group\_i}$ represents a precoding matrix corresponding to the i-th data layer group;

$y_0^{CS-RSGroup\_i}$ represents the first CSI-RS port in the i-th CSI-RS port group; and $y_{M_i-1}^{CS-RSGroup\_i}$ represents a $M_i$-th CSI-RS port in the i-th CSI-RS port group.

For example, when CSI measurement is performed by UE using CSI-RS, the UE uses PDSCH to transmit v data layers, and the v data layers are divided into two groups:

data layer group 1 including the following $N_1$ data layers: $x_0^{Layer\ Group1}, \ldots, x_{N_1-1}^{Layer\ Group1}$; and data layer group 2 including the following $N_2$ data layers: $x_0^{Layer\ Group2}, \ldots, x_{N_1-1}^{Layer\ Group2}$.

The first mapping relation between data layer group 1 and CSI-RS port group 1 is as follows.

That is, $N_1$ data layers corresponding to DMRS ports of the first group are mapped to $M_1$ CSI-RS ports included in CSI-RS port group 1 in the following scheme, where $M_1$ is greater than or equal to $N_1$:

$$
\begin{bmatrix}
y_0^{CSI-RSGroup1} \\
\vdots \\
y_{M_i-1}^{CSI-RSGroup1}
\end{bmatrix}
= W^{Group1}
\begin{bmatrix}
x_0^{LayerGroup1} \\
\vdots \\
x_{N_i-1}^{LayerGroup1}
\end{bmatrix},
$$

where $y_0^{CS-RSGroup1}, \ldots, y_{M_i-1}^{CSI-RSGroup1}$ represents $M_1$ CSI-RS ports included in CSI-RS port group 1, and $W^{Group1}$ represents a precoding matrix for transmission of data layer group 1 when the UE reports the CSI.

The first mapping relation between data layer group 2 and CSI-RS port group 2 is as follows.

That is, $N_2$ data layers corresponding to the second DMRS port group are mapped to the $M_2$ CSI-RS ports included in CSI-RS port group 2 in the following scheme, where $M_2$ is greater than or equal to $N_2$:

$$
\begin{bmatrix}
y_0^{CSI-RSGroup2} \\
\vdots \\
y_{M_2-1}^{CSI-RSGroup2}
\end{bmatrix}
= W^{Group2}
\begin{bmatrix}
x_0^{LayerGroup2} \\
\vdots \\
x_{N_2-1}^{LayerGroup2}
\end{bmatrix},
$$

where $y_0^{CS-RSGroup2}, \ldots, y_{M_2-1}^{CS-RSGroup2}$ represents $M_2$ CSI-RS ports included in CSI-RS port group 2, and $W^{Group2}$ represents a precoding matrix for transmission of data layer group 2 when the UE reports the CSI.

In S1033, the second mapping relation can be determined by using a third formula, where the third formula is denoted as:

$$
\begin{bmatrix}
y_{P_0^{(N_i-1)}}^{CSI-RSGroup\_i} \\
\vdots \\
y_{P_{N_i-1}^{(N_i-1)}}^{CSI-RSGroup\_i}
\end{bmatrix}
=
\begin{bmatrix}
x_0^{LayerGroup\_i} \\
\vdots \\
x_{N_i-1}^{LayerGroup\_i}
\end{bmatrix},
$$

where $x_0^{Layer\ Group\_i}$ represents the first data layer in the i-th data layer group;

$x_{N_i-1}^{Layer\ Group\_i}$ represents the $N_i$-th data layer in the i-th data layer group;

$$
y_{P_0^{(N_i-1)}}^{CSI-RSGroup\_i}
$$

represents a first CSI-RS port in a i-th CSI-RS port group when a rank is $(N_i-1)$; and $$
y_{P_{N_i-1}^{(N_i-1)}}^{CSI-RSGroup\_i}
$$

represents a $N_i$-th CSI-RS port in the i-th CSI-RS port group when the rank is $(N_i-1)$.

In an embodiment, the network side further indicates the second correspondence relation between each data layer group used in CSI measurement and calculation and CSI-RS ports, for example, the network indicates the following sequence in the non-PMI-PortIndication:

$p_0^{(1)}, p_0^{(2)}, p_1^{(2)}, p_0^{(3)}, p_1^{(3)}, p_2^{(3)}, \ldots, p_0^{(R)}, p_1^{(R)}, \ldots, p_{R-1}^{(R)}$ (sequences used by two CSI-RS port groups can be different or the same), where $R \in \{1, 2, \ldots, P\}$ the number of the rank, $p_0^{(R)}, p_1^{(R)}, \ldots, p_{R-1}^{(R)}$ represents R CSI-RS ports when the rank is R, and $P \in \{1, 2, 4, 8\}$ is the number of ports in the CSI-RS resource, the second mapping relation between data layer group 1 and CSI-RS port group 1 is as follows.

That is, the $N_1$ data layers corresponding to the first DMRS port group are mapped to the $N_1$ CSI-RS ports included in CSI-RS port group 1 in the following scheme:

$$
\begin{bmatrix}
y_{P_0^{(N_i-1)}}^{CSI-RSGroup1} \\
\vdots \\
y_{P_{N_i-1}^{(N_i-1)}}^{CSI-RSGroup1}
\end{bmatrix}
=
\begin{bmatrix}
x_0^{LayerGroup1} \\
\vdots \\
x_{N_i-1}^{LayerGroup1}
\end{bmatrix}.
$$

The second mapping relation between data layer group 2 and CSI-RS port group 2 is as follows.

That is, the $N_2$ data layers corresponding to the second DMRS port group are mapped to the $N_2$ CSI-RS ports included in CSI-RS port group 2 in the following scheme:

$$
\begin{bmatrix}
y_{P_0^{(N_2-1)}}^{CSI-RSGroup2} \\
\vdots \\
y_{P_{N_2-1}^{(N_2-1)}}^{CSI-RSGroup2}
\end{bmatrix}
=
\begin{bmatrix}
x_0^{Layer\ Group2} \\
\vdots \\
x_{N_2-1}^{Layer\ Group2}
\end{bmatrix}.
$$

In S1034, the third mapping relation can be determined by using a fourth formula, where the fourth formula is denoted as:

$$\begin{bmatrix} y_0^{CSI-RSGroup\_i} \\ \vdots \\ y_{N_i-1}^{CSI-RSGroup\_i} \end{bmatrix} = \begin{bmatrix} x_0^{Layer\ Group\_i} \\ \vdots \\ x_{N_i-1}^{Layer\ Group\_i} \end{bmatrix},$$

where $x_0^{Layer\ Group\_i}$ represents the first data layer in the i-th data layer group;

$x_{N_i-1}^{Layer\ Group\_i}$ represents the $N_i$-th data layer in the i-th data layer group;

$y_0^{CS-RSGroup\_i}$ represents the first CSI-RS port in the i-th CSI-RS port group; and $y_{N_i-1}^{CS-RSGroup\_i}$ represents the $N_i$-th CSI-RS port in the i-th CSI-RS port group.

In an embodiment, in case that the network side does not indicate the second correspondence relation between each data layer group used in CSI measurement and calculation and CSI-RS ports, for example, reportQuantity is set to cri-RI-CQI (that is, CRI, RI, and CQI are reported), but non-PMI-port indication is not configured, the third mapping relation between data layer group 1 and CSI-RS port group 1 is as follows.

That is, the $N_1$ data layers corresponding to the first DMRS port group are mapped to the $N_1$ CSI-RS ports included in CSI-RS port group 1 in the following scheme:

$$\begin{bmatrix} y_0^{CSI-RSGroup1} \\ \vdots \\ y_{N_i-1}^{CSI-RSGroup1} \end{bmatrix} = \begin{bmatrix} x_0^{Layer\ Group1} \\ \vdots \\ x_{N_i-1}^{Layer\ Group1} \end{bmatrix}.$$

The third mapping relation between data layer group 2 and CSI-RS port group 2 is as follows.

That is, the $N_2$ data layers corresponding to the second DMRS port group are mapped to the $N_2$ CSI-RS ports included in CSI-RS port group 2 in the following scheme:

$$\begin{bmatrix} y_0^{CSI-RSGroup2} \\ \vdots \\ y_{N_2-1}^{CSI-RSGroup2} \end{bmatrix} = \begin{bmatrix} x_0^{Layer\ Group2} \\ \vdots \\ x_{N_2-1}^{Layer\ Group2} \end{bmatrix}.$$

When the first number of data layers used for CSI measurement are mapped to the third number of CSI-RS ports, if the first number of data layers are divided into the second number of data layer groups: in case that PMI reporting is needed, the first mapping relation between each data layer group and the CSI-RS port group corresponding to the data layer group can be determined according to the precoding matrix; in case that no PMI reporting is needed, and t the second correspondence relation between each data layer group and CSI-RS ports is indicated by the network side, the second mapping relation between each data layer group and the CSI-RS port group corresponding to the data layer group can be determined according to the second correspondence relation; in case that no PMI reporting is needed, and no second correspondence relation is indicated by the network side, the third mapping relation between each data layer group and the CSI-RS port group corresponding to the data layer group can be configured, where the number of CSI-RS ports in the CSI-RS port group is greater than or equal to the number of data layers in a data layer group corresponding to the DMRS port group, and each CSI-RS port group corresponds to one CSI measurement resource, and then the CSI-RS port is configured based on the data layer group.

In an embodiment, based on the above methods, the transmission mode used in CSI measurement of S104 can include a first transmission mode, and the first transmission mode is used to characterize that only one data layer group is transmitted; and a CSI reporting mode corresponding to the first transmission mode includes a first CSI reporting mode or a second CSI reporting mode;

where the first CSI reporting mode includes reporting a CSI corresponding to one data layer group and a first identification information, and the first identification information is used to characterize a CSI-RS port group to which a data layer group to be reported is mapped; and the second CSI reporting mode includes reporting CSI corresponding to all data layer groups.

In an embodiment, the first transmission mode is dynamic point selection (DPS) transmission mode.

For example, if there are only two data layer groups, which are data layer group 1 and data layer group 2. The first transmission mode represents that only data layer group 1 is transmitted, or only data layer group 2 is transmitted. As mentioned above, these two groups of data layers correspond to CSI-RS group 1 and CSI-RS group 2 respectively.

In case that PMI reporting is needed, the signals received by the UE corresponding to a certain data layer group are:

$$H^{CSI-RSGroup1} \begin{bmatrix} y_0^{CSI-RSGroup1} \\ \vdots \\ y_{M_1-1}^{CSI-RSGroup1} \end{bmatrix},$$

or, $$H^{CSI-RSGroup2} \begin{bmatrix} y_0^{CSI-RSGroup2} \\ \vdots \\ y_{M_2-1}^{CSI-RSGroup2} \end{bmatrix};$$

and

In case that no PMI reporting is needed (for example, reportQuantity is configured to cri-RI-CQI):

in case that the network side further indicates the second correspondence relation between the data layer used for CSI measurement and calculation and the CSI-RS port, the signals received by the UE corresponding to a certain data layer group are:

$$H^{CSI-RSGroup1} \begin{bmatrix} y_{P_0^{(N_1-1)}}^{CSI-RSGroup1} \\ \vdots \\ y_{P_{N_1-1}^{(N_2-1)}}^{CSI-RSGroup1} \end{bmatrix},$$

or, $$H^{CSI-RSGroup2} \begin{bmatrix} y_{P_0^{(N_2-1)}}^{CSI-RSGroup2} \\ \vdots \\ y_{P_{N_2-1}^{(N_2-1)}}^{CSI-RSGroup2} \end{bmatrix};$$

in case that the network side does not indicate the second correspondence relation between each data layer group used in CSI measurement and calculation and CSI-RS ports, the signals received by the terminal correspond-
ing to a certain data layer group are:

$$H^{CSI-RSGroup1}\begin{bmatrix} y_0^{CSI-RSGroup1} \\ \vdots \\ y_{N_1-1}^{CSI-RSGroup1} \end{bmatrix},$$

or, $$H^{CSI-RSGroup2}\begin{bmatrix} y_0^{CSI-RSGroup2} \\ \vdots \\ y_{N_2-1}^{CSI-RSGroup2} \end{bmatrix},$$

where $H^{CSI-RSGroup1}$ is a channel matrix measured by
CSI-RS group 1, and $H^{CSI-RSGroup2}$ is a channel matrix
measured by CSI-RS group 2.

In addition, the first CSI reporting mode can only report
the CSI corresponding to data layer group 1, or only report
the CSI corresponding to data layer group 2.

When the PMI reporting is needed, a precoding matrix
used for data layer group 1 or 2 need to be reported, and the
number of data layers included in data layer group 1 or 2
need to be reported;

in case that no PMI reporting is needed, the number of
data layers included in data layer group 1 or 2 need to
be reported.

In addition, CQI and other information also need to be
reported.

The above second CSI reporting mode can report the CSI
corresponding to data layer group 1 and data layer group 2.

When the PMI reporting is needed, a precoding matrix
used for data layer group 1 and 2 can be reported, and the
number of data layers included in data layer group 1 and 2
can be reported;

in case that no PMI reporting is needed, the number of
data layers included in data layer group 1 and 2 can be
reported.

In addition, CQI can also be reported, and CRI and other
information can also be reported.

In an embodiment, based on the above methods, the
transmission mode used for CSI measurement in S104 can
include a second transmission mode, and the second trans-
mission mode is used to characterize that all data layer
groups are transmitted simultaneously; and a CSI reporting mode corresponding to the second trans-
mission mode includes reporting CSIs corresponding to
all data layer groups.

In an embodiment, the second transmission mode is
non-coherent joint transmission (NCJT) mode.

For example, if there are only two data layer groups,
which are data layer group 1 and data layer group 2. The
second transmission mode represents data layer group 1 and
data layer group 2 are transmitted simultaneously. The
signals received by the terminal corresponding to the two
data layer groups are:

in case that PMI reporting is needed:

$$H^{CSI-RSGroup1}\begin{bmatrix} y_0^{CSI-RSGroup1} \\ \vdots \\ y_{M_1-1}^{CSI-RSGroup1} \end{bmatrix} + H^{CSI-RSGroup2}\begin{bmatrix} y_0^{CSI-RSGroup2} \\ \vdots \\ y_{M_2-1}^{CSI-RSGroup2} \end{bmatrix};$$

in case that no PMI reporting is needed (for example,
reportQuantity is set to cri-RI-CQI):

in case that the network side further indicates the second
correspondence relation between each data layer group
used for CSI measurement and calculation and the
CSI-RS port, the signals received by the UE corre-
sponding to the two data layer group are:

$$H^{CSI-RSGroup1}\begin{bmatrix} y_0^{CSI-RSGroup1} \\ \vdots \\ y_{M_1-1}^{CSI-RSGroup1} \end{bmatrix} + H^{CSI-RSGroup2}\begin{bmatrix} y_0^{CSI-RSGroup2} \\ \vdots \\ y_{M_2-1}^{CSI-RSGroup2} \end{bmatrix};$$

in case that the network side does not indicate the second
correspondence relation between each data layer group
used in CSI measurement and calculation and CSI-RS
ports, the signals received by the terminal correspond-
ing to the two data layer group are:

$$H^{CSI-RSGroup1}\begin{bmatrix} y_0^{CSI-RSGroup1} \\ \vdots \\ y_{N_1-1}^{CSI-RSGroup1} \end{bmatrix} + H^{CSI-RSGroup2}\begin{bmatrix} y_0^{CSI-RSGroup2} \\ \vdots \\ y_{N_2-1}^{CSI-RSGroup2} \end{bmatrix};$$

where $H^{CSI-RSGroup1}$ is the channel matrix measured by
CSI-RS group 1, and $H^{CSI-RSGroup2}$ is the channel
matrix measured by CSI-RS group 2.

In addition, for the CSI reporting mode corresponding to
the second transmission mode:

in case that the PMI reporting is needed, a precoding
matrix used for data layer group 1 and 2, and the
number of data layers included in data layer group 1
and 2 need to be reported can be reported by the UE;

in case that no PMI reporting is needed, the number of
data layers included in data layer group 1 and 2 can be
reported.

In addition, CQI and other information can also be
reported, and CRI and other information can be further
reported.

In an embodiment, based on the above methods, the CSI
reporting mode in S104 further includes:

in case that PMI reporting is needed, reporting a precod-
ing matrix used by the data layer group to be reported
and the number of data layers of the data layer group to
be reported; and in case that no PMI reporting is needed, reporting the
number of data layers of the data layer group to be
reported.

In an embodiment, based on the above methods, the CSI
reporting mode in S104 further includes:

reporting CQI information.

The transmission mode used in CSI measurement can
include the first transmission mode used to characterize that
only one data layer group is transmitted; it can further
include the second transmission mode used to characterize
that all data layer groups are transmitted simultaneously. In
addition, the CSI reporting mode corresponding to the first
transmission mode includes the first CSI reporting mode or
the second CSI reporting mode. The first CSI reporting
mode includes reporting the CSI corresponding to one data
layer group and the first identification information. The
second CSI reporting mode includes reporting the CSI
corresponding to all data layer groups. The CSI reporting
mode corresponding to the second transmission mode
includes reporting the CSI corresponding to all data layer
groups. The transmission mode and reporting mode are
configured based on data layer group, different terminal needs and application scenarios are satisfied, and flexibility of CSI feedback is improved.

FIG. 2 is a structural diagram of an apparatus for CSI feedback according to an embodiment of the present application. The apparatus for CSI feedback can be used for electronic devices for performing CSI feedback, such as a terminal. As shown in FIG. 2, the apparatus for CSI feedback can include:

a first determining device 21, used to determine a channel state information (CSI) measurement resource corresponding to each data layer group during CSI measurement;

a second determining device 22, used to determine first correspondence relations between each data layer group and demodulation reference signal (DMRS) ports during CSI measurement;

a third determining device 23, used to determine mapping modes between each data layer group and channel state information-reference signal (CSI-RS) ports during CSI measurement;

a fourth determining device 24, used to determine transmission mode used in CSI measurement and CSI reporting mode corresponding to the transmission mode; and a CSI feedback device 25, used to perform CSI feedback according to the CSI measurement resource, the first correspondence relations, the mapping modes, the transmission mode used in the CSI measurement and the CSI reporting mode corresponding to the transmission mode.

In an embodiment, based on the above apparatuses, the first determining device 21 can include:

a grouping subdevice, used to group a first number of data layers used for CSI measurement, to obtain a second number of data layer groups; and a CSI measurement resource configuring subdevice, used to configure one CSI measurement resource for each data layer group.

In an embodiment, based on the above apparatuses, the CSI measurement resources include:

a CSI-RS resource; and/or a CSI-RS resource set; and/or different CSI-RS port subsets in a same resource.

In an embodiment, based on the above apparatuses, the second number is less than or equal to 2.

In an embodiment, based on the above apparatuses, the second determining device 22 can include:

a DMRS port group configuring subdevice, used to configure one DMRS port group for each data layer group, where the number of DMRS ports in the DMRS port group is the same as the number of data layers in a data layer group corresponding to the DMRS port group.

In an embodiment, based on the above apparatuses, each DMRS port in the DMRS port group is quasi co-located (QCL).

In an embodiment, based on the above apparatuses, the DMRS port group configuring subdevice is used to:

configure the DMRS port group by using a first formula, where the first formula is denoted as:

$$\begin{bmatrix} y_0^{DMRSGroup\_i} \\ \vdots \\ y_{N_i-1}^{DMRSGroup\_i} \end{bmatrix} = \begin{bmatrix} x_0^{Layer\ Group\_i} \\ \vdots \\ x_{N_i-1}^{Layer\ Group\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

In an embodiment, based on the above apparatuses, the third determining device 23 can include:

a mapping subdevice, used to map the first number of data layers used for CSI measurement to a third number of CSI-RS ports, and the third number is greater than or equal to the first number.

In an embodiment, based on the above apparatuses, the first number of data layers are divided into the second number of data layer groups; and the mapping subdevice includes:

a first determining device, used to determine precoding matrixes corresponding to each data layer group, and determine a first mapping relation between each data layer group and a CSI-RS port group corresponding to the data layer group according to the precoding matrixes in case that precoding matrix indicator (PMI) reporting is needed;

a second determining device, used to determine a second mapping relation between each data layer group and the CSI-RS port group corresponding to the data layer group according to the second correspondence relation in case that no PMI reporting is needed, and a second correspondence relation between each data layer group and CSI-RS ports is indicated by the network side; and a third determining device is used to configure a third mapping relation between each data layer group and the CSI-RS port group corresponding to the data layer group in case that no PMI reporting is needed, and no second correspondence relation is indicated by the network side, where the number of CSI-RS ports in the CSI-RS port group is greater than or equal to the number of data layers in a data layer group corresponding to the DMRS port group, and each CSI-RS port group corresponds to one CSI measurement resource.

In an embodiment, based on the above apparatuses, the first determining device is used to:

determine the first mapping relation by using a second formula, where the second formula is denoted as:

$$\begin{bmatrix} y_0^{CSI-RSGroup\_i} \\ \vdots \\ y_{M_i-1}^{CSI-RSGroup\_i} \end{bmatrix} = W^{Group\_i} \begin{bmatrix} x_0^{Layer\ Group\_i} \\ \vdots \\ x_{N_i-1}^{Layer\ Group\_i} \end{bmatrix},$$

where $x_0^{Layer\ Group\_i}$ represents the first data layer in the i-th data layer group;

$x_{N_i-1}^{Layer\ Group\_i}$ represents the $N_i$-th data layer in the i-th data layer group;

$W^{Group\_i}$ represents a precoding matrix corresponding to the i-th data layer group;

$y_0^{CSI-RSGroup\_i}$ represents the first CSI-RS port in the i-th CSI-RS port group; and $y_{M_i-1}^{CSI-RSGroup\_i}$ represents a $M_i$-th CSI-RS port in the i-th CSI-RS port group.

The second determining device is used to:

determine the second mapping relation by using a third formula, where the third formula is denoted as:

$$\begin{bmatrix} y^{CSI-RSGroup\_i}_{P_0^{(N_i-1)}} \\ \vdots \\ y^{CSI-RSGroup\_i}_{P_{N_i-1}^{(N_i-1)}} \end{bmatrix} = \begin{bmatrix} x_0^{Layer\ Group\_i} \\ \vdots \\ x_{N_i-1}^{Layer\ Group\_i} \end{bmatrix},$$

where $x_0^{Layer\ Group\_i}$ represents the first data layer in the i-th data layer group;

$x_{N_i-1}^{Layer\ Group\_i}$ represents the $N_i$-th data layer in the i-th data layer group;

$$y^{CSI-RSGroup\_i}_{P_{N_i-1}^{(N_i-1)}}$$

represents a first CSI-RS port in a i-th CSI-RS port group when the rank is $(N_i-1)$; and $$y^{CSI-RSGroup\_i}_{P_{N_i-1}^{(N_i-1)}}$$

represents a $N_i$-th CSI-RS port in the i-th CSI-RS port group when the rank is $(N_i-1)$.

The third determining device is used to:

determine the third mapping relation by using a fourth formula, where the fourth formula is denoted as:

$$\begin{bmatrix} y_0^{CSI-RSGroup\_i} \\ \vdots \\ y_{N_i-1}^{CSI-RSGroup\_i} \end{bmatrix} = \begin{bmatrix} x_0^{Layer\ Group\_i} \\ \vdots \\ x_{N_i-1}^{Layer\ Group\_i} \end{bmatrix},$$

where $x_0^{Layer\ Group\_i}$ represents the first data layer in the i-th data layer group;

$x_{N_i-1}^{Layer\ Group\_i}$ represents the $N_i$-th data layer in the i-th data layer group;

$y_0^{CSI-RSGroup\_i}$ represents the first CSI-RS port in the i-th CSI-RS port group; and $y_{N_i-1}^{CSI-RSGroup\_i}$ represents the $N_i$-th CSI-RS port in the i-th CSI-RS port group.

In an embodiment, based on the above apparatuses, the transmission mode used in CSI measurement include a first transmission mode, and the first transmission mode is used to characterize that only one data layer group is transmitted; and a CSI reporting mode corresponding to the first transmission mode includes a first CSI reporting mode or a second CSI reporting mode, where the first CSI reporting mode includes reporting a CSI corresponding to one data layer group and a first identification information, and the first identification information is used to characterize a CSI-RS port group to which a data layer group to be reported is mapped; and the second CSI reporting mode includes reporting CSIs corresponding to all data layer groups.

In an embodiment, based on the above apparatuses, the transmission mode used in the CSI measurement include a second transmission mode, and the second transmission mode is used to characterize that all data layer groups are transmitted simultaneously; and a CSI reporting mode corresponding to the second transmission mode includes reporting CSIs corresponding to all data layer groups.

In an embodiment, based on the above apparatuses, the CSI feedback device 25 is further used to:

in case that PMI reporting is needed, report a precoding matrix used by the data layer group to be reported and the number of data layers of the data layer group to be reported; and in case that no PMI reporting is needed, report the number of data layers of the data layer group to be reported.

In an embodiment, based on the above apparatuses, the CSI feedback device 25 is further used to:

report CQI information.

Flexibility and accuracy of CSI feedback are improved and complexity of CSI feedback is reduced by determining a CSI measurement resource corresponding to each data layer group during CSI measurement, determining first correspondence relations between each data layer group and DMRS ports during CSI measurement, determining mapping modes between each data layer group and CSI-RS ports during CSI measurement, determining transmission mode used in CSI measurement and CSI reporting mode corresponding to the transmission mode, and performing CSI feedback according to the CSI measurement resource, the first correspondence relations, the mapping modes, the transmission mode used in the CSI measurement and the CSI reporting mode corresponding to the transmission mode.

Figure 3:
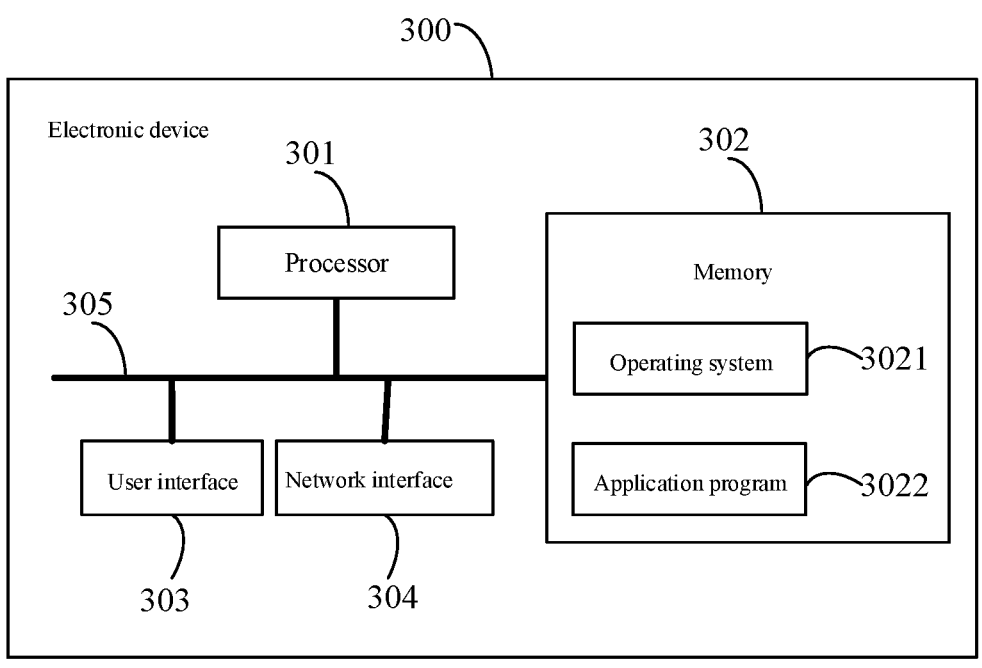
FIG. 3 is a structural diagram of an electronic device according to an embodiment of the present application.

FIG. 3 is a structural diagram of an electronic device according to an embodiment of the present application. For example, the electronic device can be a terminal. As shown in FIG. 3, the electronic device 300 may include one or more processors 301, memory 302, one or more network interfaces 304, and other user interfaces 303. Various components in the electronic device 300 are coupled together by a bus system 305. It is understood that the bus system 305 is used to enable connection communication between these components. The bus system 305 includes a power bus, a control bus, and a status signal bus in addition to a data bus. However, for clarity, various buses are labeled as the bus system 305 in FIG. 3.

The user interface 303 may include a display, a keyboard, or a pointing device, such as a mouse, a trackball, a touch pad, or a touch screen.

It can be understood that the memory 302 in the embodiment of the present application may be a volatile memory or a non-volatile memory, or may include both volatile and non-volatile memory. The non-volatile memory may be read-only memory (ROM), programmable read-only memory (PROM), erasable programmable read-only memory (Erasable PROM, EPROM), erase programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 302 of the systems and methods described in various embodiments of the present application is intended to include, but not be limited to, these and any other suitable types of memory.

In some embodiments, the memory 302 stores the following elements: executable modules or data structures, or their subsets, or their extended sets, such as an operating system 3021 and an application program 3022.

The operating system 3021 contains various system programs, such as a framework layer, a core library layer, a driver layer, etc., which are used to realize various basic businesses and handle hardware-based tasks. The application program 3022 includes various applications, such as a media player, a browser, etc., to realize various application services. A program implementing the method of the embodiment of the present application may be included in the application program 3022.

In the embodiment of the present application, the computer program or instruction stored in the memory 302 can be invoked. In an embodiment, it can be the computer program or instruction stored in the application program 3022. The processor 301 is used for:

determining a CSI measurement resource corresponding to each data layer group during CSI measurement;

determining first correspondence relations between each data layer group and DMRS ports during CSI measurement;

determining mapping modes between each data layer group and CSI-RS ports during CSI measurement;

determining transmission mode used in CSI measurement and CSI reporting mode corresponding to the transmission mode; and performing CSI feedback according to the CSI measurement resource, the first correspondence relations, the mapping modes, the transmission mode used in the CSI measurement and the CSI reporting mode corresponding to the transmission mode.

The method disclosed in the embodiment of the present application can be applied to or implemented by the processor 301. The processor 301 may be an integrated circuit chip with signal processing capability. In an implementation process, each step of the above method can be completed by the integrated logic circuit of hardware or instructions in the form of software in the processor 301. The processor 301 can be a general purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of this application may be implemented or executed. A general purpose processor may be a microprocessor or the processor may be any conventional processor and the like. The steps of the method disclosed in conjunction with the embodiments of the present application may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory 302, and the processor 301 reads the information in the memory 302 and completes the steps of the above method in combination with its hardware.

It will be appreciated that the embodiments described herein may be implemented in hardware, software, firmware, middleware, microcode, or a combination thereof. For hardware implementation, the processing device may be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic device for performing the functions described in this application or a combination thereof.

For software implementation, the described techniques can be implemented through modules (such as procedures, functions and the like) that perform the functions described in the embodiments of the present application. Software codes can be stored in memory and executed by a processor. The memory can be implemented in the processor or external to the processor.

In another embodiment, the determining a channel state information (CSI) measurement resource corresponding to each data layer group during CSI measurement includes:

grouping a first number of data layers used for CSI measurement, to obtain a second number of data layer groups; and configuring one CSI measurement resource for each data layer group.

In another embodiment, the CSI measurement resource includes:

a CSI-RS resource; and/or a CSI-RS resource set; and/or different CSI-RS port subsets in a same resource.

In another embodiment, the second number is less than or equal to 2.

In another embodiment, the determining first correspondence relations between each data layer group and DMRS ports during CSI measurement includes:

configuring one DMRS port group for each data layer group, where the number of DMRS ports in the DMRS port group is the same as the number of data layers in a data layer group corresponding to the DMRS port group.

In another embodiment, each DMRS port in the DMRS port group is quasi co-located.

In another embodiment, the configuring one DMRS port group for each data layer group includes:

configuring the DMRS port group by using a first formula, where the first formula is denoted as:

$$
\begin{bmatrix} y_0^{DMRSGroup\_i} \\ \vdots \\ y_{N_i-1}^{DMRSGroup\_i} \end{bmatrix} = \begin{bmatrix} x_0^{Layer\ Group\_i} \\ \vdots \\ x_{N_i-1}^{Layer\ Group\_i} \end{bmatrix},
$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

In another embodiment, the determining mapping modes between each data layer group and CSI-RS ports during CSI measurement includes:

mapping the first number of data layers used for CSI measurement to a third number of CSI-RS ports, and the third number is greater than or equal to the first number.

In another embodiment, the first number of data layers is divided into the second number of data layer groups;

the mapping the first number of data layers used for CSI measurement to a third number of CSI-RS ports includes:

in case that precoding matrix indicator (PMI) reporting is needed, determining precoding matrixes corresponding to each data layer group, and determining a first mapping relation between each data layer group and a CSI-RS port group corresponding to the data layer group according to the precoding matrixes;

in case that no PMI reporting is needed, and a second correspondence relation between each data layer group and CSI-RS ports is indicated by the network side, determining a second mapping relation between each data layer group and the CSI-RS port group corresponding to the data layer group according to the second correspondence relation; and in case that no PMI reporting is needed, and no second correspondence relation is indicated by the network side, configuring a third mapping relation between each data layer group and the CSI-RS port group corresponding to the data layer group, where the number of CSI-RS ports in the CSI-RS port group is greater than or equal to the number of data layers in a data layer group corresponding to the DMRS port group, and each CSI-RS port group corresponds to one CSI measurement resource.

In another embodiment, the determining a first mapping relation between each data layer group and a CSI-RS port group corresponding to the data layer group according to the precoding matrixes includes:

determining the first mapping relation by using a second formula, where the second formula is denoted as:

$$\begin{bmatrix} y_0^{CSI-RSGroup\_i} \\ \vdots \\ y_{M_i-1}^{CSI-RSGroup\_i} \end{bmatrix} = W^{Group\_i} \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$W_{Group\_i}$ represents a precoding matrix corresponding to the i-th data layer group;

$y_0^{CS-RSGroup\_i}$ represents a first CSI-RS port in a i-th CSI-RS port group; and $y_{M_i-1}^{CSI-RSGroup\_i}$ represents a $M_i$-th CSI-RS port in the i-th CSI-RS port group;

the determining a second mapping relation between each data layer group and the CSI-RS port group corresponding to the data layer group includes:

determining the second mapping relation by using a third formula, where the third formula is denoted as:

$$\begin{bmatrix} y_{P_0^{(N_i-1)}}^{CSI-RSGroup\_i} \\ \vdots \\ y_{P_{N_i-1}}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$$y_{P_{N_i-1}^{(N_i-1)}}^{CSI-RSGroup\_i}$$

represents a first CSI-RS port in a i-th CSI-RS port group when a rank is ($N_i$-1); and $$y_{P_{N_i-1}^{(N_i-1)}}^{CSI-RSGroup\_i}$$

represents a $N_i$-th CSI-RS port in the i-th CSI-RS port group when the rank is ($N_i$-1);

the configuring a third mapping relation between each data layer group and the CSI-RS port group corresponding to the data layer group includes:

determining the third mapping relation by using a fourth formula, where the fourth formula is denoted as:

$$\begin{bmatrix} y_0^{CSI-RSGroup\_i} \\ \vdots \\ y_{N_i-1}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{CSI-RSGroup\_i}$ represents a first CSI-RS port in a i-th CSI-RS port group; and $y_{N_i-1}^{CSI-RSGroup\_i}$ represents a $N_i$-th CSI-RS port in the i-th CSI-RS port group.

In another embodiment, the transmission mode used in CSI measurement include a first transmission mode, and the first transmission mode is used to characterize that only one data layer group is transmitted; and a CSI reporting mode corresponding to the first transmission mode includes a first CSI reporting mode or a second CSI reporting mode, where the first CSI reporting mode includes reporting a CSI corresponding to one data layer group and a first identification information, and the first identification information is used to characterize a CSI-RS port group to which a data layer group to be reported is mapped; and the second CSI reporting mode includes reporting CSIs corresponding to all data layer groups.

In another embodiment, the transmission mode used in the CSI measurement include a second transmission mode, and the second transmission mode is used to characterize that all data layer groups are transmitted simultaneously; and a CSI reporting mode corresponding to the second transmission mode includes reporting CSIs corresponding to all data layer groups.

In another embodiment, the processor 301 is further used for:

in case that PMI reporting is needed, reporting a precoding matrix used by the data layer group to be reported and the number of data layers of the data layer group to be reported; and in case that no PMI reporting is needed, reporting the number of data layers of the data layer group to be reported.

In another embodiment, the processor 301 is further used for:

reporting CQI information.

The electronic device according to the embodiment of the present application may perform various processes implemented by the electronic device in the foregoing embodiments, and details are not described herein again to avoid repetition.

It can be seen from the above embodiments that by determining a CSI measurement resource corresponding to each data layer group during CSI measurement, determining first correspondence relations between each data layer group and DMRS ports during CSI measurement, determining mapping modes between each data layer group and CSI-RS ports during CSI measurement, determining transmission mode used in CSI measurement and CSI reporting mode corresponding to the transmission mode, and performing CSI feedback according to the CSI measurement resource, the first correspondence relations, the mapping modes, the transmission mode used in the CSI measurement and the CSI reporting mode corresponding to the transmission mode, flexibility and accuracy of CSI feedback are improved and complexity of CSI feedback is reduced.

FIG. 4 is a structural diagram of an electronic device according to another embodiment of the present application, for example, the electronic device can be a terminal; The electronic device in FIG. 4 can be a mobile phone, a tablet PC, a personal digital assistant (PDA), an electronic reader, a handheld game console, a point of sales (POS), a vehicular electronic device (a vehicular computer), etc. As shown in FIG. 4, the electronic device includes a radio frequency (RF) circuit 410, a memory 420, an input device 430, a display device 440, a processor 460, an audio circuit 470, a wireless-fidelity (WiFi) device 480, and a power supply 490. The mobile phone structure shown in FIG. 4 does not constitute a limitation of the mobile phone, and can include more or fewer components than shown in the figure, or combination of some components, or separation of some components, or different component arrangements.

The input device 430 can be used to receive digital or character information input by the user, and generate the signal input related to the user setting and function control of the electronic device. In an embodiment of the present application, the input device 430 can include a touch panel 4301. The touch panel 4301, also known as the touch screen, can collect touch operations of a user on or near the touch panel 4301 (such as an operation of the user on the touch panel 4301 with any suitable object or accessory such as finger, stylus, etc.), and drive a corresponding connection apparatus according to a preset program. In an embodiment, the touch panel 4301 can include two parts: a touch detection apparatus and a touch controller. The touch detection apparatus detects touch orientation of the user, detects the signal brought by the touch operation, and transmits the signal to the touch controller. The touch controller receives the touch information from the touch detection apparatus, converts it into contact coordinates, sends it to the processor 460, and can receive and execute commands from the processor 460. In addition, the touch panel 4301 can be types of resistance, capacitance, infrared, surface acoustic wave and others. In addition to the touch panel 4301, the input device 430 can further include other input devices 4302, which can be used to receive input digital or character information, and generate key signal input related to user settings and function control of electronic devices. In an embodiment, other input devices 4302 may include, but are not limited to, one or more of physical keyboards, function keys (such as volume control keys, switch keys, etc.), trackballs, mice, operating levers, optical mice (optical mice are touch sensitive surfaces that do not display visual output, or are extensions of touch sensitive surfaces formed by touch screens), etc.

The display device 440 can be used to display the information input by the user or the information provided to the user and various menu interfaces of the electronic device. The display device 440 may include a display panel 4401.

The display panel 4401 can be configured in forms of liquid crystal display (LCD), organic light emitting diode (OLED), etc.

It should be noted that the touch panel 4301 can cover the display panel 4401 to form a touch screen. When the touch screen detects a touch operation on or near it, it transmits the touch operation to the processor 460 to determine the type of touch event, and then the processor 460 provides corresponding visual output on the touch screen according to the type of touch event.

The touch screen includes application interface display area and common control display area. The arrangement mode of the present application interface display area and the common control display area is not limited, and can be arranged up and down, left and right, etc. The arrangement mode of the two display areas can be distinguished. The present application interface display area can be used to display the present application interface. Each interface can include one or more of an application icon and/or a widget desktop control and other interface elements. The present application interface display area can also be an empty interface without any content. The common control display area is used to display a control with high usage rate, such as a setting button, an interface number, a scroll bar, a phonebook icon and other application icons.

The RF circuit 410 can be used in receiving and sending information, a call, or receiving and sending signals. In particular, the RF circuit 410 receives downlink information of the network side and sends it to the processor 460 for processing. In addition, designed uplink data is sent to the network side. Generally, RF circuit 410 includes, but is not limited to, an antenna, one or more amplifiers, a transceiver, a coupler, a low noise amplifier (LNA), a duplexer, etc. In addition, the RF circuit 410 can also communicate with networks and other devices through wireless communication. The wireless communication can use any communication standard or protocol, including, but not limited to, global system of mobile communication (GSM), general packet radio service (GPRS), code division multiple access (CDMA), wideband code division multiple access (WCDMA), long term evolution (LTE), E-mail, short messaging service (SMS), etc.

The memory 420 is used to store software programs and modules, and the processor 460 executes various functional applications and data processing of electronic devices by running software programs and modules stored in the memory 420. The memory 420 may mainly include a storage program area and a storage data area. The storage program area may store an operating system, an application program required for one or more functions (such as a sound playing function, an image playing function, etc.), etc. The storage data area can store data (such as audio data, phone book, etc.) created according to the use of electronic devices. In addition, the memory 420 may include high-speed random access memory, and may further include nonvolatile memory, such as one or more disk storage devices, a flash memory device, or other volatile solid-state storage devices.

The processor 460 is a control center of the electronic device, which uses various interfaces and lines to connect various parts of the entire mobile phone, and performs various functions and processing data of the electronic device by running or executing software programs and/or modules stored in the first memory 4201, and invoking data stored in the second memory 4202, to monitor the electronic device as a whole. In an embodiment, the processor 460 may include one or more processing units.

In the embodiment of the present application, by invoking software programs and/or modules stored in the first memory 4201 and/or data stored in the second memory 4202, the processor 460 is used for:

determining a CSI measurement resource corresponding to each data layer group during CSI measurement;

determining first correspondence relations between each data layer group and DMRS ports during CSI measurement;

determining mapping modes between each data layer group and CSI-RS ports during CSI measurement;

determining transmission mode used in CSI measurement and CSI reporting mode corresponding to the transmission mode; and performing CSI feedback according to the CSI measurement resource, the first correspondence relations, the mapping modes, the transmission mode used in the CSI measurement and the CSI reporting mode corresponding to the transmission mode.

In another embodiment, the determining a channel state information (CSI) measurement resource corresponding to each data layer group during CSI measurement includes:

grouping a first number of data layers used for CSI measurement, to obtain a second number of data layer groups; and configuring one CSI measurement resource for each data layer group.

In another embodiment, the CSI measurement resource includes:

a CSI-RS resource; and/or a CSI-RS resource set; and/or different CSI-RS port subsets in a same resource.

In another embodiment, the second number is less than or equal to 2.

In another embodiment, the determining first correspondence relations between each data layer group and DMRS ports during CSI measurement includes:

configuring one DMRS port group for each data layer group, where the number of DMRS ports in the DMRS port group is the same as the number of data layers in a data layer group corresponding to the DMRS port group.

In another embodiment, each DMRS port in the DMRS port group is quasi co-located.

In another embodiment, the configuring one DMRS port group for each data layer group includes:

configuring the DMRS port group by using a first formula, where the first formula is denoted as:

$$\begin{bmatrix} y_0^{DMRSGroup\_i} \\ \vdots \\ y_{N_i-1}^{DMRSGroup} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

In another embodiment, the determining mapping modes between each data layer group and CSI-RS ports during CSI measurement includes:

mapping the first number of data layers used for CSI measurement to a third number of CSI-RS ports, and the third number is greater than or equal to the first number.

In another embodiment, the first number of data layers is divided into the second number of data layer groups;

the mapping the first number of data layers used for CSI measurement to a third number of CSI-RS ports includes:

in case that precoding matrix indicator (PMI) reporting is needed, determining precoding matrixes corresponding to each data layer group, and determining a first mapping relation between each data layer group and a CSI-RS port group corresponding to the data layer group according to the precoding matrixes;

in case that no PMI reporting is needed, and a second correspondence relation between each data layer group and CSI-RS ports is indicated by a network side, determining a second mapping relation between each data layer group and the CSI-RS port group corresponding to the data layer group according to the second correspondence relation; and in case that no PMI reporting is needed, and no second correspondence relation is indicated by the network side, configuring a third mapping relation between each data layer group and the CSI-RS port group corresponding to the data layer group, where the number of CSI-RS ports in the CSI-RS port group is greater than or equal to the number of data layers in a data layer group corresponding to the DMRS port group, and each CSI-RS port group corresponds to one CSI measurement resource.

In another embodiment, the determining a first mapping relation between each data layer group and a CSI-RS port group corresponding to the data layer group according to the precoding matrixes includes:

determining the first mapping relation by using a second formula, where the second formula is denoted as:

$$\begin{bmatrix} y_0^{CSI-RSGroup\_i} \\ \vdots \\ y_{M_i-1}^{CSI-RSGroup\_i} \end{bmatrix} = W^{Group\_i} \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$W^{Group\_i}$ represents a precoding matrix corresponding to the i-th data layer group;

$y_0^{CSI-RSGroup\_i}$ represents a first CSI-RS port in a i-th CSI-RS port group; and $y_{M_i-1}^{CSI-RSGroup\_i}$ represents a $M_i$-th CSI-RS port in the i-th CSI-RS port group;

the determining a second mapping relation between each data layer group and the CSI-RS port group corresponding to the data layer group includes:

determining the second mapping relation by using a third formula, where the third formula is denoted as:

$$\begin{bmatrix} y_{P_0^{(N_i-1)}}^{CSI-RSGroup\_i} \\ \vdots \\ y_{P_{N_i-1}^{(N_i-1)}}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$$y_{P_{N_i-1}^{(N_i-1)}}^{CSI-RSGroup\_i}$$

represents a first CSI-RS port in a i-th CSI-RS port group when a rank is ($N_i$−1); and $$y_{P_{N_i-1}^{(N_i-1)}}^{CSI-RSGroup\_i}$$

represents a $N_i$-th CSI-RS port in the i-th CSI-RS port group when the rank is ($N_i$−1);

the configuring a third mapping relation between each data layer group and the CSI-RS port group corresponding to the data layer group includes:

determining the third mapping relation by using a fourth formula, where the fourth formula is denoted as:

$$\begin{bmatrix} y_0^{CSI-RSGroup\_i} \\ \vdots \\ y_{N_i-1}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

where $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{CSI-RSGroup\_i}$ represents a first CSI-RS port in a i-th CSI-RS port group; and $y_{N_i-1}^{CSI-RSGroup\_i}$ represents a $N_i$-th CSI-RS port in the i-th CSI-RS port group.

In another embodiment, the transmission mode used in CSI measurement include a first transmission mode, and the first transmission mode is used to characterize that only one data layer group is transmitted; and a CSI reporting mode corresponding to the first transmission mode includes a first CSI reporting mode or a second CSI reporting mode, where the first CSI reporting mode includes reporting a CSI corresponding to one data layer group and a first identification information, and the first identification information is used to characterize a CSI-RS port group to which a data layer group to be reported is mapped; and the second CSI reporting mode includes reporting CSIs corresponding to all data layer groups.

In another embodiment, the transmission mode used in the CSI measurement includes a second transmission mode, and the second transmission mode is used to characterize that all data layer groups are transmitted simultaneously; and a CSI reporting mode corresponding to the second transmission mode includes reporting CSIs corresponding to all data layer groups.

In another embodiment, the processor 460 is further used for:

in case that PMI reporting is needed, reporting a precoding matrix used by the data layer group to be reported and the number of data layers of the data layer group to be reported; and in case that no PMI reporting is needed, reporting the number of data layers of the data layer group to be reported.

In another embodiment, the processor 460 is further used for:

reporting CQI information.

The electronic device according to the embodiment of the present application may perform various processes implemented by the electronic device in the foregoing embodiments, and details are not described herein again to avoid repetition.

Flexibility and accuracy of CSI feedback are improved and complexity of CSI feedback is reduced by determining a CSI measurement resource corresponding to each data layer group during CSI measurement, determining first correspondence relations between each data layer group and DMRS ports during CSI measurement, determining mapping modes between each data layer group and CSI-RS ports during CSI measurement, determining transmission mode used in CSI measurement and CSI reporting mode corresponding to the transmission mode, and performing CSI feedback according to the CSI measurement resource, the first correspondence relations, the mapping modes, the transmission mode used in the CSI measurement and the CSI reporting mode corresponding to the transmission mode.

The solutions according to the embodiments of the present application have been described from the perspective of the electronic device. It can be understood that, in order to provide the above-mentioned functions, the electronic device provided by the embodiments of the present application includes corresponding hardware structures and/or software modules for executing each function. The present application can be implemented in hardware or a combination of hardware and computer software with the units and algorithm steps of each example described in conjunction with the embodiments disclosed in the present application.

Whether certain function is executed by a computer software or driving hardware depends on the specific application and design constraint conditions of the embodiments. Professionals and technicians can use different methods for each specific application to implement the described functions, but such implementation should not be considered beyond the scope of the present application.

In the embodiments of the present application, the electronic device can be divided into functional modules and the like according to the foregoing method examples. For example, each functional module can be divided corresponding to each function, or two or more functions can be integrated into a processing device. The above-mentioned integrated unit can be implemented in the form of hardware or software functional unit.

It should be noted that, the division of modules in the embodiments of the present application is schematic, and is only a logical function division, and there may be other division manners in actual implementation.

For the convenience and conciseness of the description, only the division of the above-mentioned functional modules is used for illustration. In practical applications, the above-mentioned functions can be allocated to different functional modules as required. The internal structure of the device is divided into different functional modules to complete all or part of the functions described above. For the specific working process of the system, apparatus and unit described above, reference may be made to the corresponding process in the foregoing method embodiments, and details are not described herein again.

In the several embodiments provided in the present application, it should be understood that the disclosed device and method may be implemented in other manners. For example, the device embodiments described above are only illustrative. For example, the division of the modules or units is only a logical function division and there may be other division methods in actual implementation. For example, multiple units or elements may be Incorporation may either be integrated into another system, or some features may be omitted, or not implemented. On the other hand, the shown or discussed mutual coupling or direct coupling or communication connection may be indirect coupling or communication connection of devices or units through some interfaces.

The units described as separate components may or may not be physically separate, and the components displayed as units may or may not be physical units, that is, may be located at the same place, or it can be distributed to multiple network units. Some or all of the units may be selected according to actual needs to achieve the purpose of the solution of the present embodiment.

In addition, the functional units in the various embodiments of the present application may be integrated into one processing unit, or each unit may exist alone physically, or two or more units may be integrated into one unit. The above-mentioned integrated units may be implemented in the form of software functional units.

If the integrated unit is implemented in the form of a software functional unit and sold or used as an independent product, it can be stored in a computer readable storage medium. Based on such understanding, a part of or all the solutions may be embodied in the form of a software product, which is stored in a storage medium, including several instructions to cause a computer device (which may be a personal computer, server, or network device, etc.) to perform all or part of the steps of the methods described in the respective embodiments of the present application. The computer storage medium is non transitory medium, including: a flash memory, a mobile hard disk, a read-only memory, a random access memory, a magnetic disc or an optical disc and other media that can store program codes.

The embodiments of the present application further provide a computer program product. The computer program product includes a computer program stored on a non-transitory computer-readable storage medium. The computer program includes program instructions. When the program instructions are executed by a computer, the computer can perform the method for CSI feedback according to the above method embodiments. The method includes:

determining a CSI measurement resource corresponding to each data layer group during CSI measurement;
determining first correspondence relations between each data layer group and DMRS ports during CSI measurement;
determining mapping modes between each data layer group and CSI-RS ports during CSI measurement;
determining a transmission mode used in CSI measurement and a CSI reporting mode corresponding to the transmission mode; and
performing CSI feedback according to the CSI measurement resource, the first correspondence relations, the mapping modes, the transmission mode used in the CSI measurement and the CSI reporting mode corresponding to the transmission mode.

The embodiments of the present application further provide a non-transitory computer-readable storage medium having a computer program stored thereon, where the computer program, when executed by a processor, causes the processor to perform methods of any one the above-mentioned embodiments, including:

determining a CSI measurement resource corresponding to each data layer group during CSI measurement;
determining first correspondence relations between each data layer group and DMRS ports during CSI measurement;
determining mapping modes between each data layer group and CSI-RS ports during CSI measurement;
determining a transmission mode used in CSI measurement and a CSI reporting mode corresponding to the transmission mode; and
performing CSI feedback according to the CSI measurement resource, the first correspondence relations, the mapping modes, the transmission mode used in the CSI measurement and the CSI reporting mode corresponding to the transmission mode.

What is claimed is:

1. A method for channel state information (CSI) feedback, comprising:

determining a CSI measurement resource corresponding to each data layer group during CSI measurement;
determining first correspondence relations between each data layer group and demodulation reference signal (DMRS) ports during CSI measurement;
determining mapping modes between each data layer group and channel state information reference signal (CSI-RS) ports during CSI measurement;
determining a transmission mode used in CSI measurement and a CSI reporting mode corresponding to the transmission mode; and
performing CSI feedback according to the CSI measurement resource, the first correspondence relations, the mapping modes, the transmission mode used in the CSI measurement and the CSI reporting mode corresponding to the transmission mode;
wherein the determining mapping modes between each data layer group and CSI-RS ports during CSI measurement comprises:
mapping a first number of data layers used for CSI measurement to a third number of CSI-RS ports, wherein the third number is greater than or equal to the first number;
wherein the determining first correspondence relations between each data layer group and DMRS ports during CSI measurement comprises:
configuring one DMRS port group for each data layer group, wherein the number of DMRS ports in the DMRS port group is the same as the number of data layers in a data layer group corresponding to the DMRS port group;
wherein each DMRS port in the DMRS port group is quasi co-located;
wherein the configuring one DMRS port group for each data layer group comprises:
configuring the DMRS port group by using a first formula, wherein the first formula is denoted as:

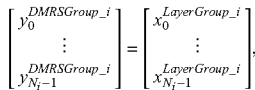

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

2. The method of claim 1, wherein the determining a CSI measurement resource corresponding to each data layer group during CSI measurement comprises:

grouping a first number of data layers used for CSI measurement, to obtain a second number of data layer groups; and configuring one CSI measurement resource for each data layer group.

3. The method of claim 1, wherein a first number of data layers are divided into a second number of data layer groups; and the mapping a first number of data layers used for CSI measurement to a third number of CSI-RS ports comprises:

in case that precoding matrix indicator (PMI) reporting is needed, determining precoding matrixes corresponding to each data layer group, and determining a first mapping relation between each data layer group and a CSI-RS port group corresponding to the data layer group according to the precoding matrixes;

in case that no PMI reporting is needed, and a second correspondence relation between each data layer group and CSI-RS ports is indicated by a network side, determining a second mapping relation between each data layer group and a CSI-RS port group corresponding to the data layer group according to the second correspondence relation; and in case that no PMI reporting is needed, and no second correspondence relation is indicated by the network side, configuring a third mapping relation between each data layer group and a CSI-RS port group corresponding to the data layer group, wherein the number of CSI-RS ports in the CSI-RS port group is greater than or equal to the number of data layers in a data layer group corresponding to the DMRS port group, and each CSI-RS port group corresponds to one CSI measurement resource.

4. The method of claim 3, wherein the determining a first mapping relation between each data layer group and a CSI-RS port group corresponding to the data layer group according to the precoding matrixes comprises:

determining the first mapping relation by using a second formula, wherein the second formula is denoted as:

$$
\begin{bmatrix} y_0^{CSI-RSGroup\_i} \\ \vdots \\ y_{M_i-1}^{CSI-RSGroupo\_i} \end{bmatrix} = W^{Group\_i} \begin{bmatrix} x_0^{LayerGroup\_i} \\ \vdots \\ x_{N_i-1}^{LayerGroup\_i} \end{bmatrix},
$$

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$W^{Group\_i}$ represents a precoding matrix corresponding to the i-th data layer group;

$y_0^{CSI-RSGroup\_i}$ represents a first CSI-RS port in a i-th CSI-RS port group; and $y_{M_i-1}^{CSI-RSGroup\_i}$ represents a Mi-th CSI-RS port in the i-th CSI-RS port group;

the determining a second mapping relation between each data layer group and the CSI-RS port group corresponding to the data layer group comprises:

determining the second mapping relation by using a third formula, wherein the third formula is denoted as:

$$
\begin{bmatrix} y_{P_0^{(N_i-1)}}^{CSI-RSGroup\_i} \\ \vdots \\ y_{P_{N_i-1}^{(N_i-1)}}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},
$$

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$$
y_{P_0^{(N_i-1)}}^{CSI-RSGroup\_i}
$$

represents a first CSI-RS port in a i-th CSI-RS port group when a rank is $(N_i-1)$; and $$
y_{P_{N_i-1}^{(N_i-1)}}^{CSI-RSGroup\_i}
$$

represents a Ni-th CSI-RS port in the i-th CSI-RS port group when the rank is $(N_i-1)$;

the configuring a third mapping relation between each data layer group and the CSI-RS port group corresponding to the data layer group comprises:

determining the third mapping relation by using a fourth formula, wherein the fourth formula is denoted as:

$$
\begin{bmatrix} y_0^{CSI-RSGroup\_i} \\ \vdots \\ y_{N_i-1}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},
$$

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{CSI-RSGroup\_i}$ represents a first CSI-RS port in a i-th CSI-RS port group; and $y_{N_i-1}^{CSI-RSGroup\_i}$ represents a $N_i$-th CSI-RS port in the i-th CSI-RS port group.

5. The method of claim 1, wherein the transmission mode used in CSI measurement comprises a first transmission mode, and the first transmission mode is used to characterize that only one data layer group is transmitted; and a CSI reporting mode corresponding to the first transmission mode comprises a first CSI reporting mode or a second CSI reporting mode, wherein the first CSI reporting mode comprises reporting a CSI corresponding to one data layer group and a first identification information, and the first identification information is used to characterize a CSI-RS port group to which a data layer group to be reported is mapped; and the second CSI reporting mode comprises reporting CSIs corresponding to all data layer groups.

6. The method of claim 5, further comprising:

in case that PMI reporting is needed, reporting a precoding matrix used by the data layer group to be reported and the number of data layers of the data layer group to be reported; and in case that no PMI reporting is needed, reporting the number of data layers of the data layer group to be reported;

reporting CQI information.

7. The method of claim 1, wherein the transmission mode used in the CSI measurement comprises a second transmission mode, and the second transmission mode is used to characterize that all data layer groups are transmitted simultaneously; and a CSI reporting mode corresponding to the second transmission mode comprises reporting CSIs corresponding to all data layer groups.

8. An electronic device, comprising, a processor, and a memory having a computer program stored thereon executable by the processor, wherein the computer program, when executed by the processor, causes the processor to perform the following steps:

determining a channel state information (CSI) measurement resource corresponding to each data layer group during CSI measurement;

determining first correspondence relations between each data layer group and demodulation reference signal (DMRS) ports during CSI measurement;

determining mapping modes between each data layer group and channel state information-reference signal (CSI-RS) ports during CSI measurement;

determining a transmission mode used in CSI measurement and a CSI reporting mode corresponding to the transmission mode; and performing CSI feedback according to the CSI measurement resource, the first correspondence relations, the mapping modes, the transmission mode used in the CSI measurement and the CSI reporting mode corresponding to the transmission mode;

wherein the determining mapping modes between each data layer group and CSI-RS ports during CSI measurement comprises:

mapping a first number of data layers used for CSI measurement to a third number of CSI-RS ports, and the third number is greater than or equal to the first number;

wherein the determining first correspondence relations between each data layer group and DMRS ports during CSI measurement comprises:

configuring one DMRS port group for each data layer group, wherein the number of DMRS ports in the DMRS port group is the same as the number of data layers in a data layer group corresponding to the DMRS port group;

wherein each DMRS port in the DMRS port group is quasi co-located;

wherein the configuring one DMRS port group for each data layer group comprises:

configuring the DMRS port group by using a first formula, wherein the first formula is denoted as:

$$
\begin{bmatrix} y_0^{DMRSGroup\_i} \\ \vdots \\ y_{N_i-1}^{DMRSGroup\_i} \end{bmatrix} = \begin{bmatrix} x_0^{LayerGroup\_i} \\ \vdots \\ x_{N_i-1}^{LayerGroup\_i} \end{bmatrix},
$$

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{DMRSGroup\_i}$ represents a first DMRS port in a i-th DMRS port group; and $y_{N_i-1}^{DMRSGroup\_i}$ represents a $N_i$-th DMRS port in the i-th DMRS port group.

9. The electronic device of claim 8, wherein the determining a channel state information (CSI) measurement resource corresponding to each data layer group during CSI measurement comprises:

grouping a first number of data layers used for CSI measurement, to obtain a second number of data layer groups; and configuring one CSI measurement resource for each data layer group.

10. The electronic device of claim 8, wherein a first number of data layers are divided into a second number of data layer groups; and the mapping a first number of data layers used for CSI measurement to a third number of CSI-RS ports comprises:

in case that precoding matrix indicator (PMI) reporting is needed, determining precoding matrixes corresponding to each data layer group, and determining a first mapping relation between each data layer group and a CSI-RS port group corresponding to the data layer group according to the precoding matrixes;

in case that no PMI reporting is needed, and a second correspondence relation between each data layer group and CSI-RS ports is indicated by a network side, determining a second mapping relation between each data layer group and a CSI-RS port group corresponding to the data layer group according to the second correspondence relation; and in case that no PMI reporting is needed, and no second correspondence relation is indicated by the network side, configuring a third mapping relation between each data layer group and a CSI-RS port group corresponding to the data layer group, wherein the number of CSI-RS ports in the CSI-RS port group is greater than or equal to the number of data layers in a data layer group corresponding to the DMRS port group, and each CSI-RS port group corresponds to one CSI measurement resource.

11. The electronic device of claim 10, wherein the determining a first mapping relation between each data layer group and a CSI-RS port group corresponding to the data layer group according to the precoding matrixes comprises:

determining the first mapping relation by using a second formula, wherein the second formula is denoted as:

$$
\begin{bmatrix} y_0^{CSI-RSGroup\_i} \\ \vdots \\ y_{M_i-1}^{CSI-RSGroup\_i} \end{bmatrix} = W^{Group\_i} \begin{bmatrix} x_0^{LayerGroup\_i} \\ \vdots \\ x_{N_i-1}^{LayerGroup\_i} \end{bmatrix},
$$

wherein $x_0^{Layer\ Group\_i}$ represents a first data layer in a i-th data layer group;

$x_{N_i-1}^{Layer\ Group\_i}$ represents a Ni-th data layer in the i-th data layer group;

$W^{Group\_i}$ represents a precoding matrix corresponding to the i-th data layer group;

$y_0^{CSI-RSGroup\_i}$ represents a first CSI-RS port in a i-th CSI-RS port group; and $y_{M_i-1}^{CSI-RSGroup\_i}$ represents a Mi-th CSI-RS port in the i-th CSI-RS port group;

the determining a second mapping relation between each data layer group and the CSI-RS port group corresponding to the data layer group comprises:

determining the second mapping relation by using a third formula, wherein the third formula is denoted as:

$$\begin{bmatrix} y_{P_0^{(N_i-1)}}^{CSI-RSGroupo\_i} \\ \vdots \\ y_{P_{N_i-1}^{(N_i-1)}}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$$y_{P_0^{(N_i-1)}}^{CSI-RSGroup\_i}$$

represents a first CSI-RS port in a i-th CSI-RS port group when a rank is $(N_i-1)$; and $$y_{P_{N_i-1}^{(N_i-1)}}^{CSI-RSGroup\_i}$$

represents a $N_i$-th CSI-RS port in the i-th CSI-RS port group when the rank is $(N_i-1)$;

the configuring a third mapping relation between each data layer group and the CSI-RS port group corresponding to the data layer group comprises:

determining the third mapping relation by using a fourth formula, wherein the fourth formula is denoted as:

$$\begin{bmatrix} y_0^{CSI-RSGroup\_i} \\ \vdots \\ y_{N_i-1}^{CSI-RSGroup\_i} \end{bmatrix} = \begin{bmatrix} x_0^{LayerGroup\_i} \\ \vdots \\ x_{N_i-1}^{LayerGroup\_i} \end{bmatrix},$$

wherein $x_0^{Layer\ Group\_i}$ represents a first data layer in a i-th data layer group;

$x_{N_i-1}^{Layer\ Group\_i}$ represents a $N_i$-th data layer in the i-th data layer group;

$y_0^{CSI-RSGroup\_i}$ represents a first CSI-RS port in a i-th CSI-RS port group; and $y_{N_i-1}^{CSI-RSGroup\_i}$ represents a $N_i$-th CSI-RS port in the i-th CSI-RS port group.

12. The electronic device of claim 8, wherein the transmission mode used in CSI measurement comprises a first transmission mode, and the first transmission mode is used to characterize that only one data layer group is transmitted; and a CSI reporting mode corresponding to the first transmission mode comprises a first CSI reporting mode or a second CSI reporting mode, wherein the first CSI reporting mode comprises reporting a CSI corresponding to one data layer group and a first identification information, and the first identification information is used to characterize a CSI-RS port group to which a data layer group to be reported is mapped; and the second CSI reporting mode comprises reporting CSIs corresponding to all data layer groups.

13. The electronic device of claim 12, wherein the computer program, when executed by the processor, causes the processor to perform the following steps:

in case that PMI reporting is needed, reporting a precoding matrix used by the data layer group to be reported and the number of data layers of the data layer group to be reported; and in case that no PMI reporting is needed, reporting the number of data layers of the data layer group to be reported;

reporting CQI information.

14. The electronic device of claim 8, wherein the transmission mode used in the CSI measurement comprises a second transmission mode, and the second transmission mode is used to characterize that all data layer groups are transmitted simultaneously; and a CSI reporting mode corresponding to the second transmission mode comprises reporting CSIs corresponding to all data layer groups.

* * * * *